(12) United States Patent
Bonet et al.

(10) Patent No.: US 8,063,295 B2
(45) Date of Patent: Nov. 22, 2011

(54) METHOD AND SYSTEM FOR VIDEO AND FILM RECOMMENDATION

(75) Inventors: Antonio Trias Bonet, Sant Cugat del Valles (ES); Jesús Sanz Marcos, Salinas (Asturias) (ES); Antonio Trias Llopis, Sant Cugat del Valles (ES); María Gimena Llopis Rivas, Barcelona (ES)

(73) Assignee: Polyphonic Human Media Interface, S.L., Barcelona (ES)

( * ) Notice: Subject to any disclaimer, the term of this patent is extended or adjusted under 35 U.S.C. 154(b) by 965 days.

(21) Appl. No.: 11/881,810

(22) Filed: Jul. 27, 2007

(65) Prior Publication Data

US 2008/0059287 A1     Mar. 6, 2008

Related U.S. Application Data

(63) Continuation-in-part of application No. 11/492,355, filed on Jul. 25, 2006, now abandoned, which is a continuation of application No. 10/678,505, filed on Oct. 3, 2003, now Pat. No. 7,081,579.

(60) Provisional application No. 60/415,868, filed on Oct. 3, 2002, provisional application No. 60/857,627, filed on Nov. 8, 2006.

(51) Int. Cl.
*G10H 7/10* (2006.01)

(52) U.S. Cl. ........................................... 84/608

(58) Field of Classification Search ..................... 84/608
See application file for complete search history.

(56) References Cited

U.S. PATENT DOCUMENTS

| | | |
|---|---|---|
| 5,616,876 A | 4/1997 | Cluts |
| 5,792,971 A | 8/1998 | Timis et al. |
| 5,918,223 A * | 6/1999 | Blum et al. ........................ 1/1 |
| 6,284,964 B1 | 9/2001 | Suzuki et al. |
| 6,560,366 B1 * | 5/2003 | Wilkins ..................... 382/236 |
| 7,081,579 B2 | 7/2006 | Alcalde et al. |
| 2002/0002899 A1 | 1/2002 | Gjerdingen et al. |
| 2002/0147628 A1 | 10/2002 | Specter et al. |
| 2003/0045953 A1 | 3/2003 | Weare |
| 2004/0039913 A1 | 2/2004 | Kruse |

* cited by examiner

*Primary Examiner* — Jianchun Qin

(74) *Attorney, Agent, or Firm* — Whiteford, Taylor & Preston LLP; Jeffrey C. Maynard

(57) ABSTRACT

An artificial intelligence video analysis recommendation system and method is provided that allows video viewers to discover new videos and video producers to evaluate the potential success of a new project as well as to understand the perceptual factors beneath audience ratings. The system and method accomplish these tasks by analyzing a database of video in order to identify key similarities between different pieces of video, and then recommends pieces of video to a user depending upon their video preferences. An embodiment enables a user to evaluate a new video's similarity to videos already established as commercially valuable.

2 Claims, 23 Drawing Sheets
(16 of 23 Drawing Sheet(s) Filed in Color)

METHOD AND SYSTEM FOR VIDEO AND FILM RECOMMENDATION

CROSS REFERENCE TO RELATED APPLICATIONS

This application is a continuation-in-part of copending and co-owned U.S. patent application Ser. No. 11/492,355, filed with the U.S. Patent and Trademark Office on Jul. 25, 2006 entitled "Method and System for Music Recommendation", which is a continuation of co-owned U.S. patent application Ser. No. 10/678,505, filed with the U.S. Patent and Trademark Office on Oct. 3, 2003 entitled "Method and System for Music Recommendation", now U.S. Pat. No. 7,081,579, which is based upon and claims benefit of copending and co-owned U.S. Provisional Patent Application Ser. No. 60/415,868 entitled "Method and System for Music Recommendation", filed with the U.S. Patent and Trademark Office on Oct. 3, 2002 by the inventors herein, the specifications of which are incorporated herein by reference.

This application also claims benefit of copending and co-owned U.S. Provisional Patent Application Ser. No. 60/857,627 entitled "Music Intelligence Universe Server", filed with the U.S. Patent and Trademark Office on Nov. 8, 2006 by the inventors herein, the specification of which is incorporated herein by reference.

BACKGROUND OF THE INVENTION

1. Field of the Invention

The invention disclosed herein relates generally to methods and systems for analyzing and using digital video compositions, and more particularly to a method and system for determining the characteristics of a video composition using measurable criteria.

2. Background of the Prior Art

Historically, much of what attracts us to a particular song is found in the basic structure of the music. Particular rhythms, changes in key and certain melodic patterns define the psychological and very human response we all have to music. In a similar fashion, particular characteristic variables of films, video-shorts, mobile videos, music videos, videogames, advertisings, video clips, and television programs affect how viewers respond to the production.

While the number of possible plot lines combined with all of the other variables in recorded films, video-shorts, mobile videos, music videos, videogames, advertisings, video clips and television programs allow for a seemingly infinite number of combinations, the patterns that we find pleasing have not changed. By analyzing images, sound, script, and structure similar mathematical patterns can be discerned.

This document will refer to the term "video" as a generic term to include all video formats including films, video-shorts, mobile videos, music videos, videogames, advertisings, video clips, and television programs, among others.

SUMMARY OF THE INVENTION

It is an object of the present invention to provide a method and system for measuring the characteristics of a video composition, and establishing a collection of digital video compositions that may be sorted upon such characteristics.

It is another object of the present invention to enable a method and system to compare digital video files to discover video similarities.

It is another object of the present invention to provide a method and system for determining a preferred video characteristic profile for a video viewer.

It is another object of the present invention to provide a method and system for analyzing "videos" (films, video-shorts, mobile videos, music videos, videogames, advertisings, video clips, and television programs) to make video recommendations, video classification, video discovery, personalized video games.

It is another object of the present invention to enable a method and system to compare new digital video files with historical commercially successful videos.

It is another object of the present invention to provide a method and system for analyzing "videos" (films, video-shorts, mobile videos, music videos, videogames, advertisings, video clips, and television programs, among others) to predict market success.

In accordance with the above objects, an artificial intelligence recommendation system and method is provided. The system and method accomplish this task by analyzing, for each video format, a database of films, video-shorts, mobile videos, music videos, videogames, advertisings, video clips and television programs in order to identify key similarities between different videos, and then recommending videos to a user depending upon their preferences.

The system uses a series of complex artificial intelligence algorithms to analyze a plurality of characteristics in a video composition. The characteristics analyzed are relevant variables for characterizing films, video-shorts, mobile videos, music videos, videogames, advertisings, video clips and television programs, among others, including: image analysis (both static and video dynamics), sound analysis (including video, voice, sounds, and noise), script analysis, structural analysis (length, scene structure, scene changes etc), and metadata analysis (name of studio, director, actors, etc. . . . ). This approach enables the creation of "constellations" of videos with similar characteristics, even from different genres and styles, enabling fast, accurate, and less costly comparison of films, TV programs, and videos for potential market success, video classification, and recommendation. The video recommendation includes video discovery and personalization through all digital channels including internet, mobile, personal computers and hand set devices.

The various features of novelty that characterize the invention will be pointed out with particularity in the claims of this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other objects, features, and advantages of the present invention will become more apparent from the following detailed description of the preferred embodiments and certain modifications thereof when taken together with the accompanying drawings, in which.

DESCRIPTION OF EXEMPLARY EMBODIMENTS

The invention summarized above and defined by the enumerated claims may be better understood by referring to the following description, which should be read in conjunction with the accompanying drawings. This description of an embodiment, set out below to enable one to build and use an implementation of the invention, is not intended to limit the enumerated claims, but to serve as particular examples thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
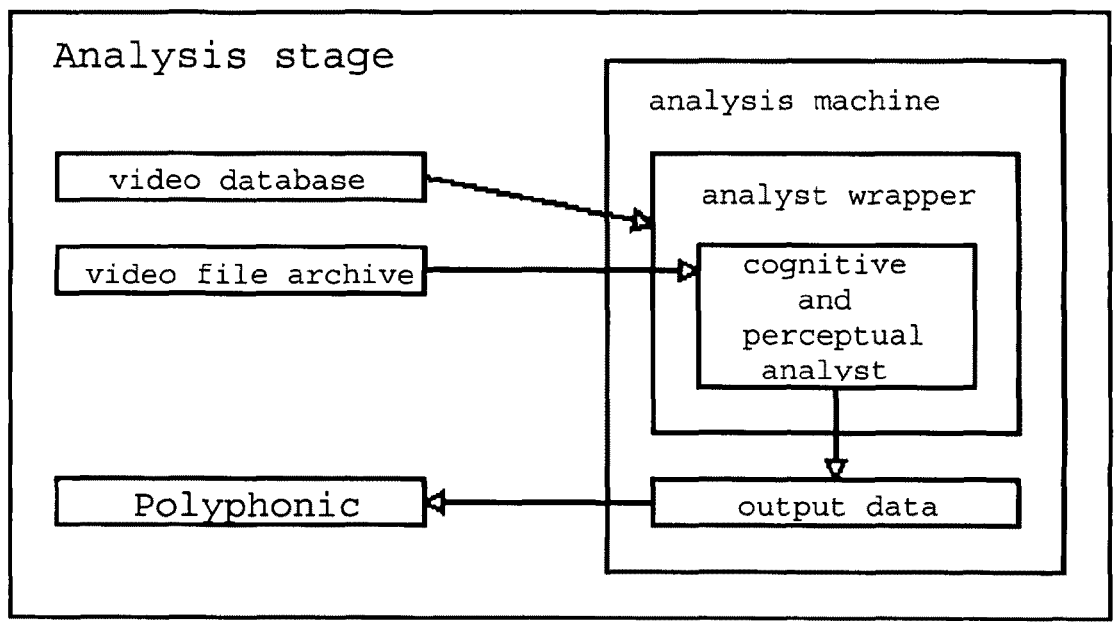
FIG. 1 is a basic overview of a system according to the present invention.

FIG. 1 depicts a schematic view of a system architecture for enabling the transfer and processing of digital video files to an automated digital video file analysis tool in order to generate an output file that, as described in greater detail below, serves as a descriptor of the measurable characteristics of the particular video composition that was analyzed. As shown in FIG. 1, an "analyst wrapper" script receives digital video files from the video database or a video file archive, preferably copies the particular digital video file to a location on a computer network on which the analysis system is stored, decompresses the digital video file when necessary, and passes the file to the analysis engine for processing. The output of such analysis engine is directed to an output text file that, in turn, may be used by the recommendation utilities described below.

The raw materials for the system are films, video-shorts, mobile videos, music videos, videogames, advertisings, video clips, and television programs. These are stored in a digital file, which is the main starting point for all embodiments of the invention. The first step performed by the system is to analyze an existing digital video file in order to create a descriptive profile for the video characteristics of the file. In a first stage, the analysis portion reads a "video" file and extracts some data. This data can be represented as a series of numbers, which are the main input for future processing. Such processing depends on the final application, and can use algorithms such as Principal Components Analysis (PCA), KNearest Neighbors (kNN), etc.

The processes, according to the present invention, start by analyzing a large and representative sample of video files. A database is created for each country consisting of movies that have performed well, within the best window time frame. For example, historical data for movies would include: national and worldwide sales and distribution figures, revenues, DVD/video sales and rental figures, audience ratings, awards garnered, release date, season, permanence of the movie, re-releases of the movie, etc. Additional data may include data associated with the Title, director, actors, studio, music production, associated books for the script (if any) etc. For TV programs, the database is similar, but may also include historical information on minute-to-minute audience ratings for each program. The minute-to-minute information will be aggregated and disaggregated according to the learning systems described herein. The process analyzes several characteristics of the video, such as sound and camera movements, and measures how the characteristics change over time. Parameter analysis is described in U.S. Pat. No. 7,081,579 to Alcalde et al. the specification of which is included herein by reference, in its entirety.

The purpose of the initial analysis performed by the system is to analyze a variety of physical parameters of the videos stored in the database. Such physical parameters describe quantifiable characteristics of the film or TV program that may be mathematically modeled to create a descriptive, electronic "descriptors' vector" for each video. Moreover, the analyzed parameters are based on cognitive and perceptual analysis, and the system is referred to as a Media Intelligence Universe System. The characteristics have been identified to be the ones that are measurable and quantifiable. Often the characteristics are detected unconsciously. In general, the mix of parameters is more important than any individual parameter. To implement the methods described herein, the system particularly analyzes one or more of the following characteristics for each video composition. Not all of the characteristics necessarily provide distinctions in the video program. Combinations of some or all of these characteristics may be employed without departing from the spirit and scope of the instant invention.

Figure 2:
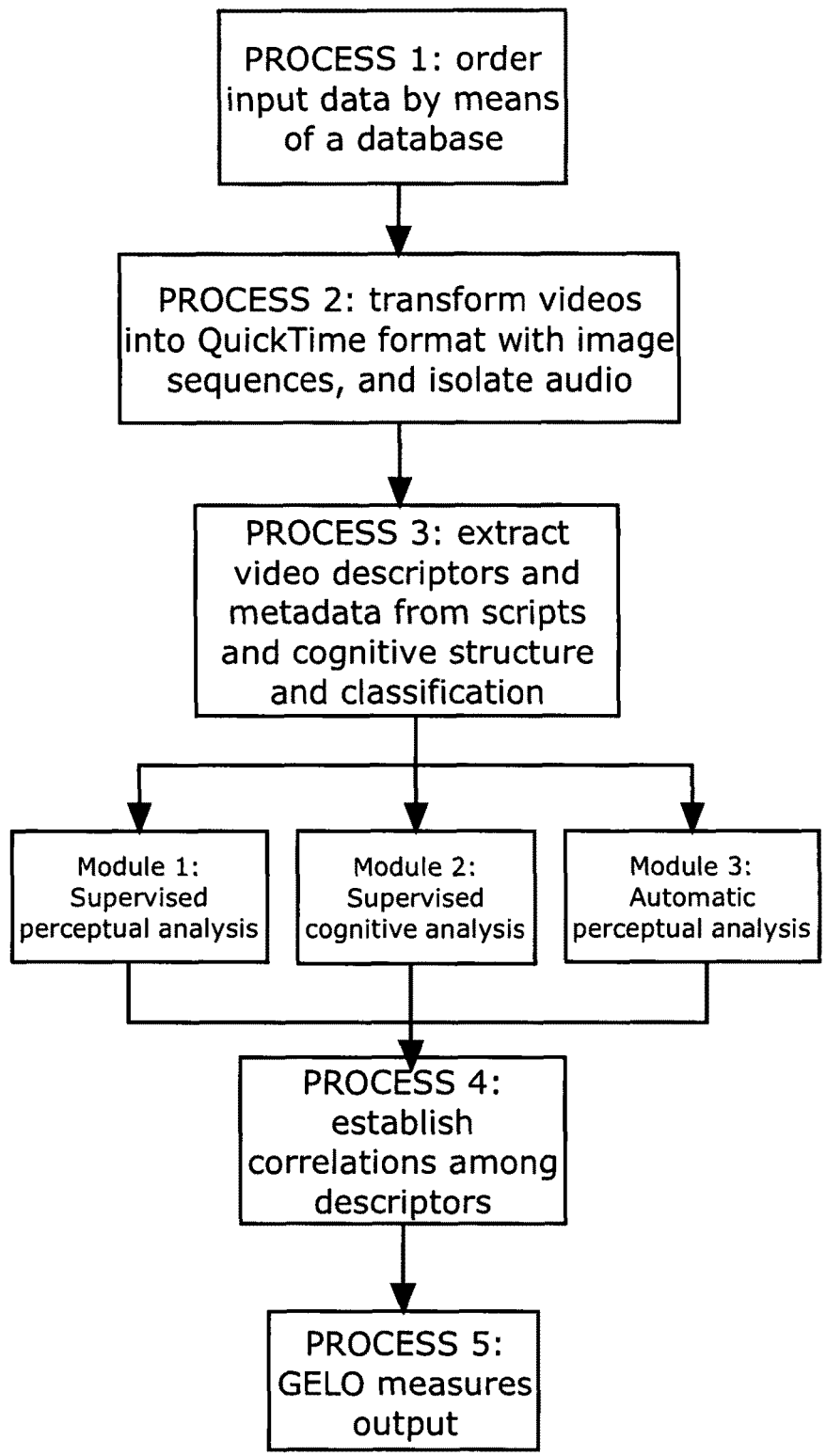
FIG. 2 is a flowchart of the process steps according to the present invention.

The parameters that are mathematically analyzed can be divided into four primary components with accompanying sub-components, which include:

1. Static Image Analysis Includes
Brightness Scale
Gamma Scale
Color Spectrum
Object Presence and Focus
Picture's Spatial Correlation
Image textures
Symmetries
Image Noise 2. Video and Image Movements
Cut Frequency
Camera Movements: Static Camera, zoom, panning
Rhythm
Scene objects' movement
Scene Length
Object presence: Faces, stenography elements, etc
3. Script Analysis
Key words, stop words, stemming techniques
Nominal sintagmas, expressions, combination of key words
Structural information
Mood related parameters
4. Music and Sound
Sound
Voices
Noise
Music Variables including
   Sonic Brilliance
   Timbre
   Rhythm and Tempo
   Placement of Music
   Volume and Amplitude
   Octave
   Mood related parameters of the music The main processes of the Media Intelligence Technology are shown in FIG. 2.

PROCESS 1: To order the input data by means of a database.

PROCESS 2: To transform the videos into QuickTime format with image sequences, and to isolate the audio.

PROCESS 3: To extract video descriptors and metadata from the scripts and cognitive scene structure and classification.

PROCESS 4: To establish correlations among descriptors.

PROCESS 5: To establish output measures.

Process #1 organizes data in a Database and allows to correct and detect errors in the input data, both in the files and structure. In the case of TV programs, the data coming from the audience and from the programs are processed together.

For Process #2, the videos are transformed (consisting of several recordings in QuickTime format, divided by advertisements in some cases) into sequences of frames/photograms and audio files.

As an example, we will describe a chapter of a soap opera. It can be observed that the advertisements are located immediately after the soap opera. However, most of the advertisements are also divided into video files respectively. In the case of TV programs, frames/photograms provide a lot of information concerning the introduction of advertisements.

The frame/photogram extraction method has proven to be very efficient to analyze a great amount of videos quickly. While projecting on a high resolution, up to 13×10 frames/photograms (grabbed with a rate of 2 per second), it is possible to immediately display about 30 seconds per chapter. This display, together with the characters' identification, is carried out in parallel.

Process #3 comprises the following main modules:

Module 1: Supervised perceptual analysis. Extraction of the amount of characters and identification of the characters in a scene without using the script information.

Module 2: Supervised cognitive analysis. Three parameters are evaluated for each scene.

2.1 Scene character: The first of them is the scene typology. Some of the possible values considered include:
  a. COMIC RELIEF
  b. FRIENDSHIP
  c. LOVE
  d. FAMILY LOVE
  e. ATTRACTION
  f. JEALOUSY
  g. DISAPPOINTMENT/LACK OF LOVE
  h. DISCUSSION/PSYCHOLOGICAL VIOLENCE
  i. UNFAITHFULNESS/DECEPTION
  j. DAYDREAM
  k. END OF PLOT
  i. TURN-PLOT
  m. DRAMATIC IMPACT
  n. START OF PLOT
  o. INTEREST
  p. INTRIGUE
  q. DEATH
  r. CHARACTERS' PRESENTATION
  s. NO APPARENT CONTRIBUTION
  t. SUSPENSE
  u. LOCATION
  v. TRANSITION
  w. CHARACTERS 2.2 Scene intensity: level of intensity inside the contextual thread followed by the chapter. It corresponds to a number between 1 and 5. This supervised analysis has been carried out for both soap operas.

2.3 Type of scene: advertisement, credits, or scene with characters from the series.

Module 3: Automatic perceptual analysis. For this analysis, several techniques can be used. The results of applying a frame/photogram input rate to the system of 2 frames/photograms per second and an audio sample frequency of 24 kHz with only one channel is presented as an example.

Figure 3:
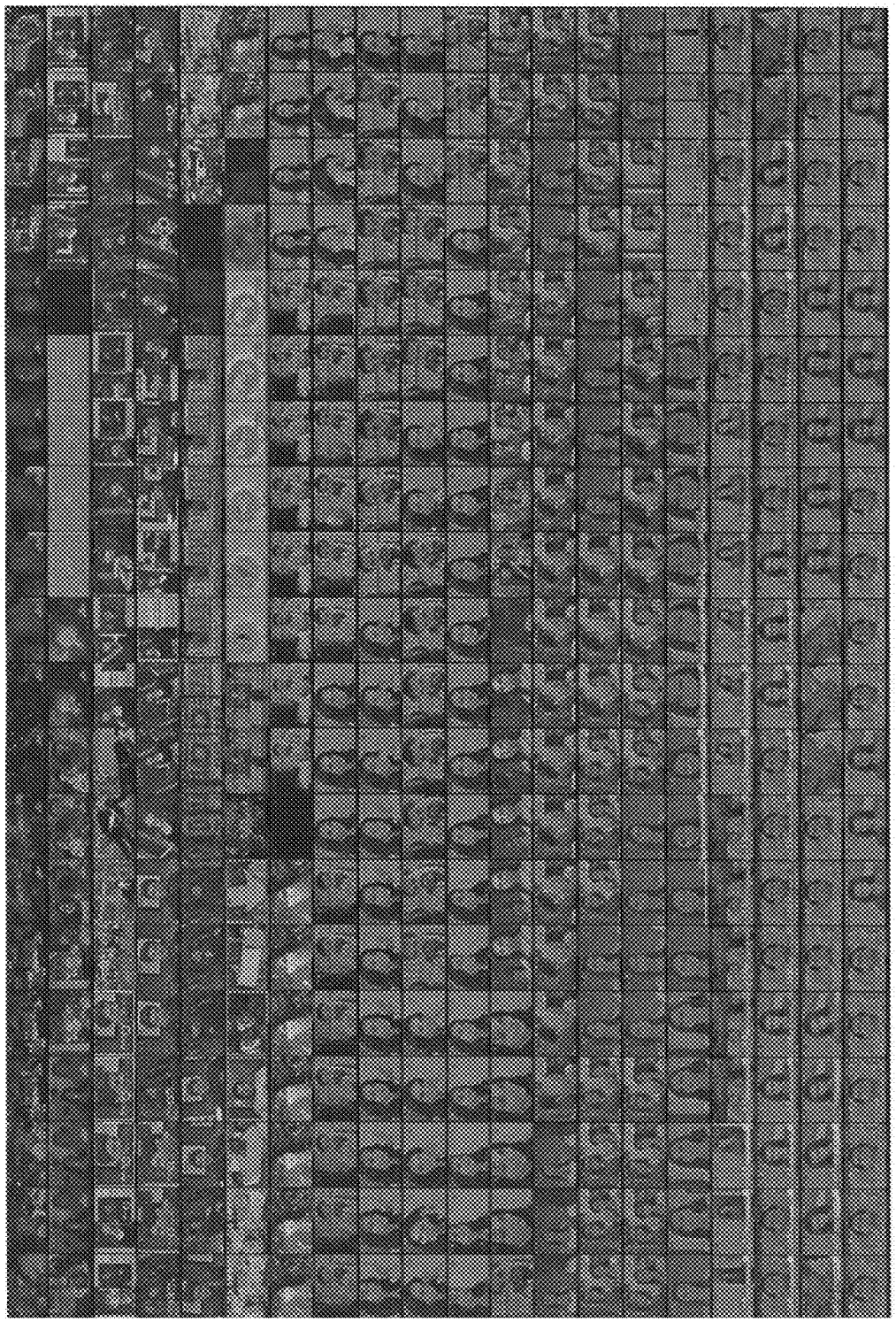
FIG. 3 is a frame/photogram sequence showing an image when translating channels according to the present invention.

The first processing unit calculates simple statistics (such as the amount of red, green, blue, saturation, light level/luminosity, tone, and other complex parameters such as the light level period (until the second order) and the statistic parameter called Hu's Momentum which is invariable with rotation and scale/range. FIG. 3 shows a frame/photogram sequence that shows an image when translating the channels red, green, and blue to tone, saturation, and light level/luminosity.

The following processing unit calculates the tone and saturation histogram in order to distinguish the most present tonalities. As it can be observed, at the left top section of each photogram there is a black box of 4×4 strips corresponding to the tone-saturation two-dimensional histogram. This system is very useful to automatically locate scene and shot changes because the histogram should not vary with mouth movements and face gestures during a conversation among several characters of the video.

Figure 4:
FIG. 4 is a tone and saturation histogram according to the present invention.

It is possible to observe this characteristic in the photogram sequence. As seen in FIG. 4, the advertisements have different histograms compared with the rest of frames/photograms in the case of TV programs, with the objective of attracting more attention.

Figure 5:
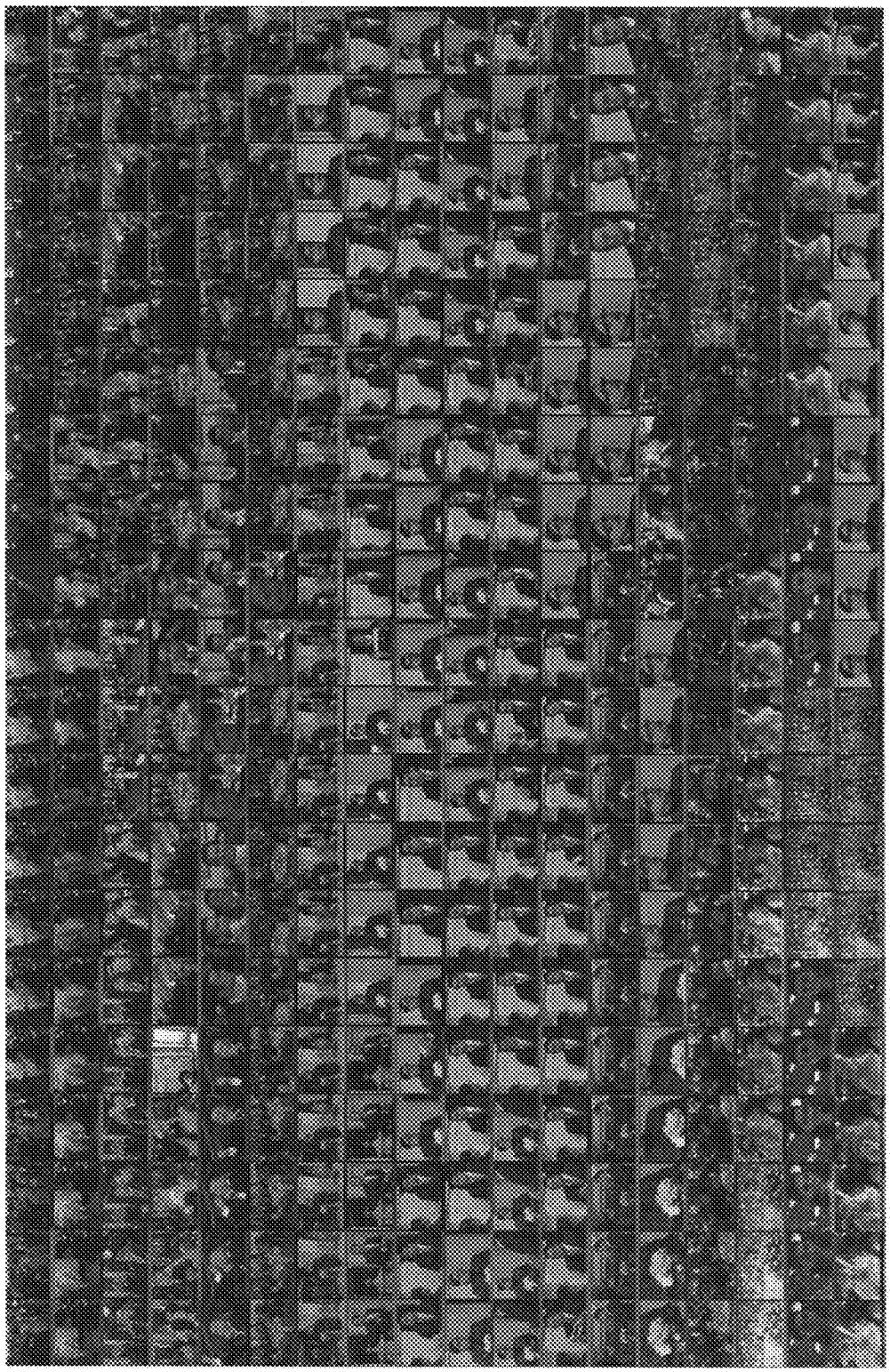
FIG. 5 is a frame/photogram histogram with a marker according to the present invention.
Figure 6:
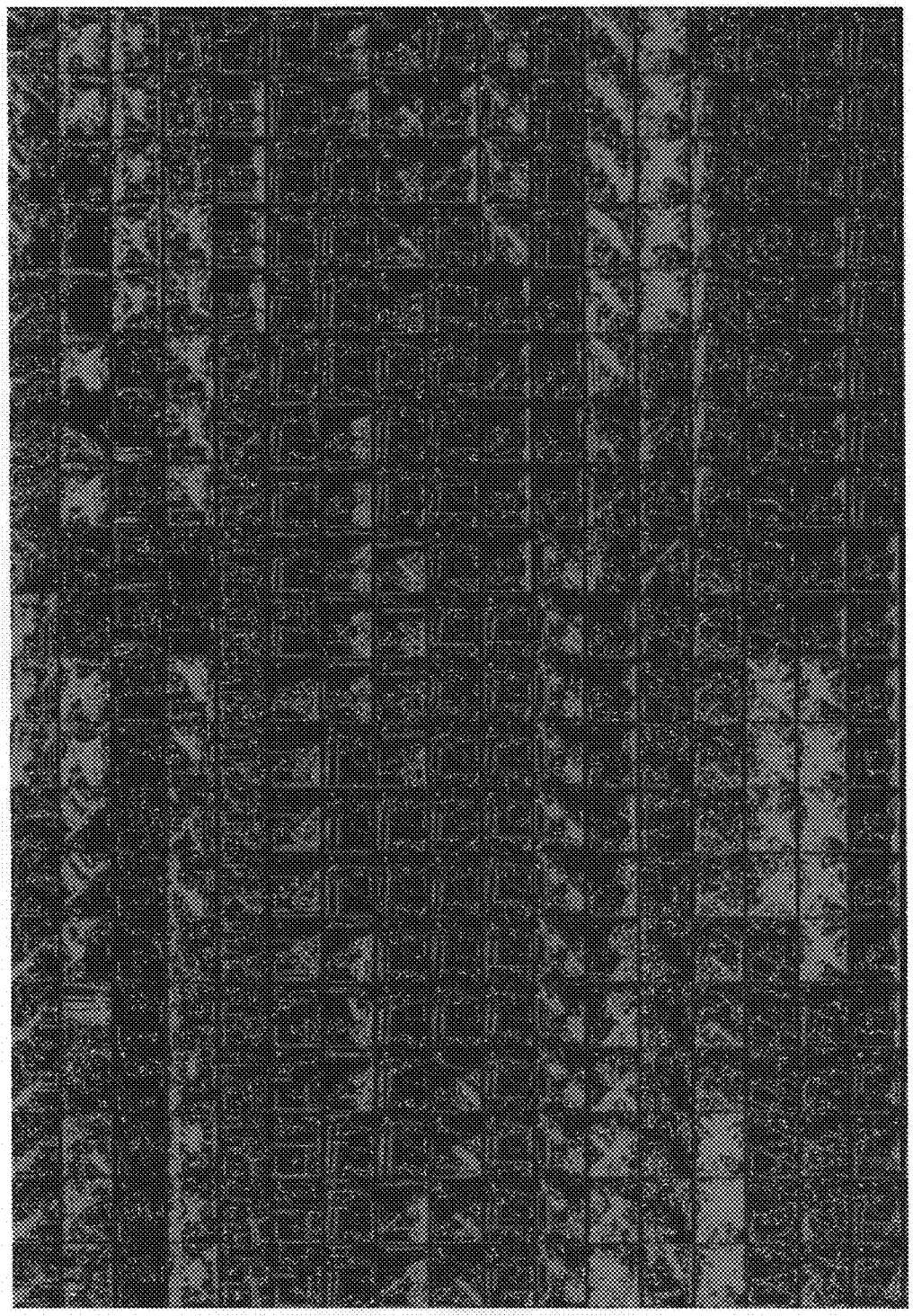
FIG. 6 illustrates a processed frame/photogram sequence according to the present invention.

The third processing unit looks for structures made up by lines, aiming to help with the determination of the visual complexity of an image. FIG. 5 shows the original frames/photograms with a marker (it appears in red color at the bottom of each frame/photogram). For this specific example, the marker provides information about the quantity of linear structures in the image. FIG. 6 illustrates a processed sequence.

Figure 7:
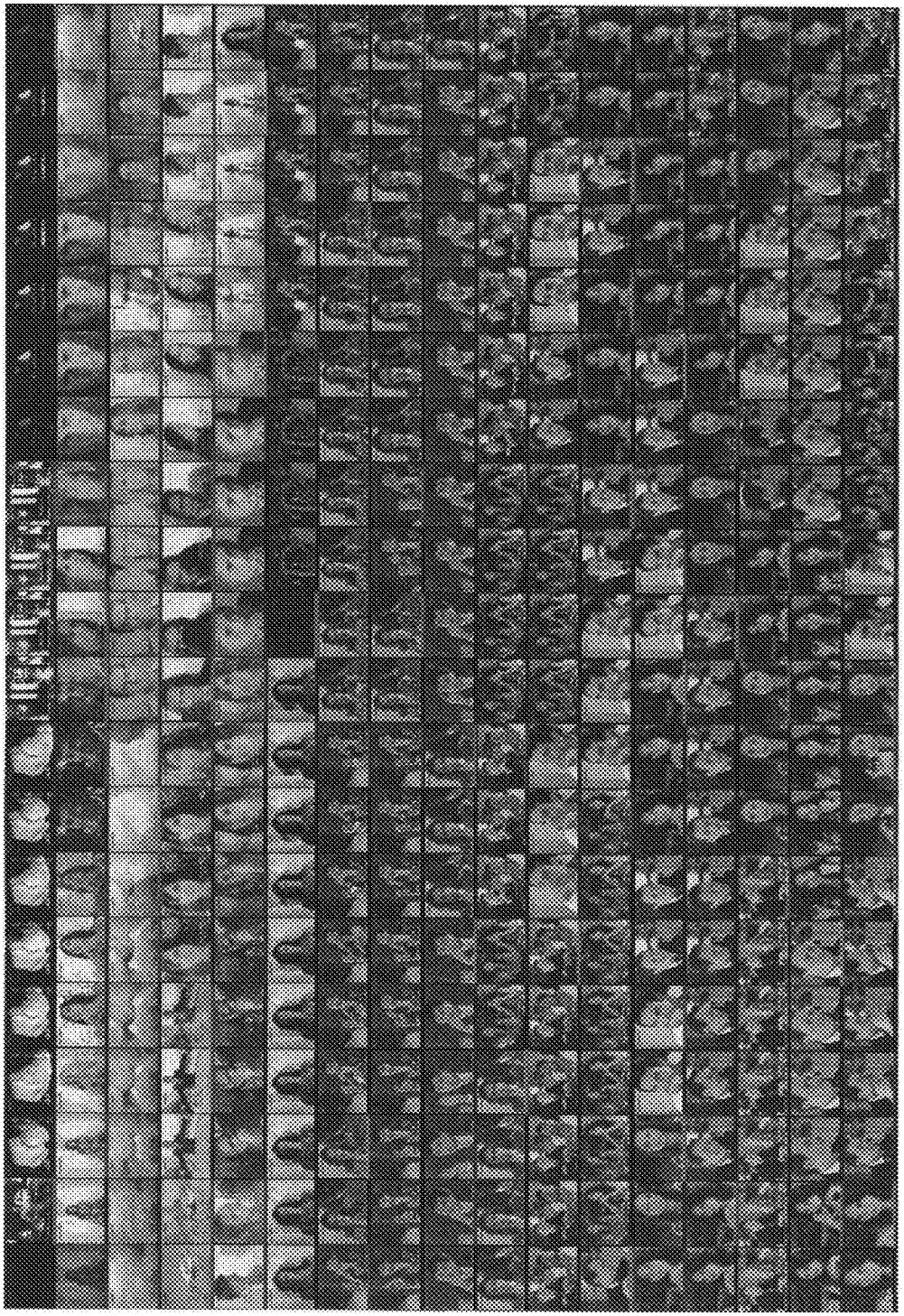
FIG. 7 is a frame/photogram sequence for detecting abrupt changes of shots and scene according to the present invention.

The next processing unit of an image is one of the most complex in the whole system. It deals with the calculation of the amount of movement between two consecutive frames/photograms (optical flow). From other point of view, the objective is to calculate if a frame/photogram sequence does not show abrupt changes of shots and scene (see FIG. 7).

Figure 8:
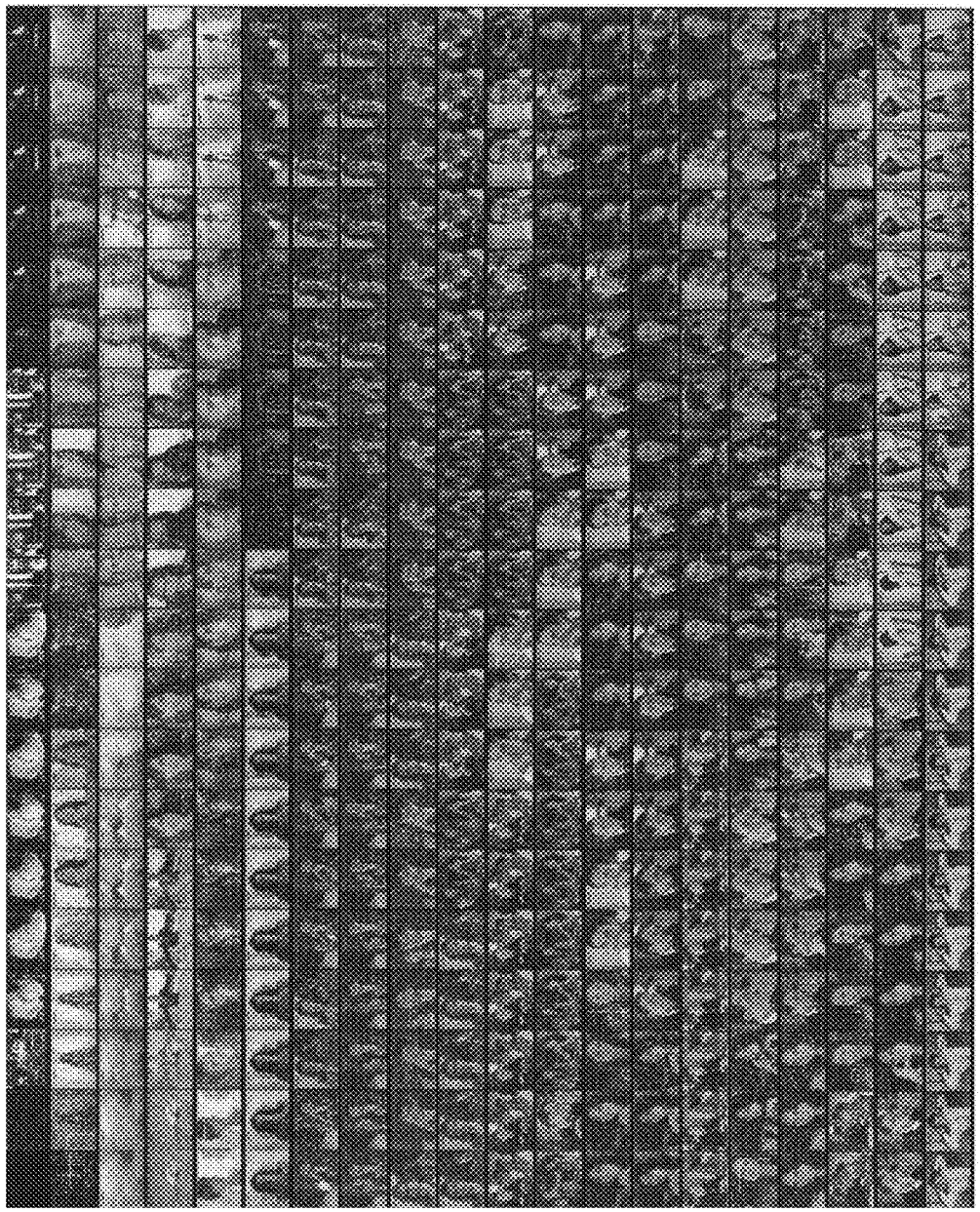
FIG. 8 represents the calculations made in a record/computation process of the optical flow parameter according to the present invention.

FIG. 8 represents the calculations made in the record/computation process of the optical flow parameter. The basic idea is to find an equivalent for every pixel in the frame/photogram below. If there is a short distance between both positions for all image pixels, the frame/photogram sequence is static.

Figure 9:
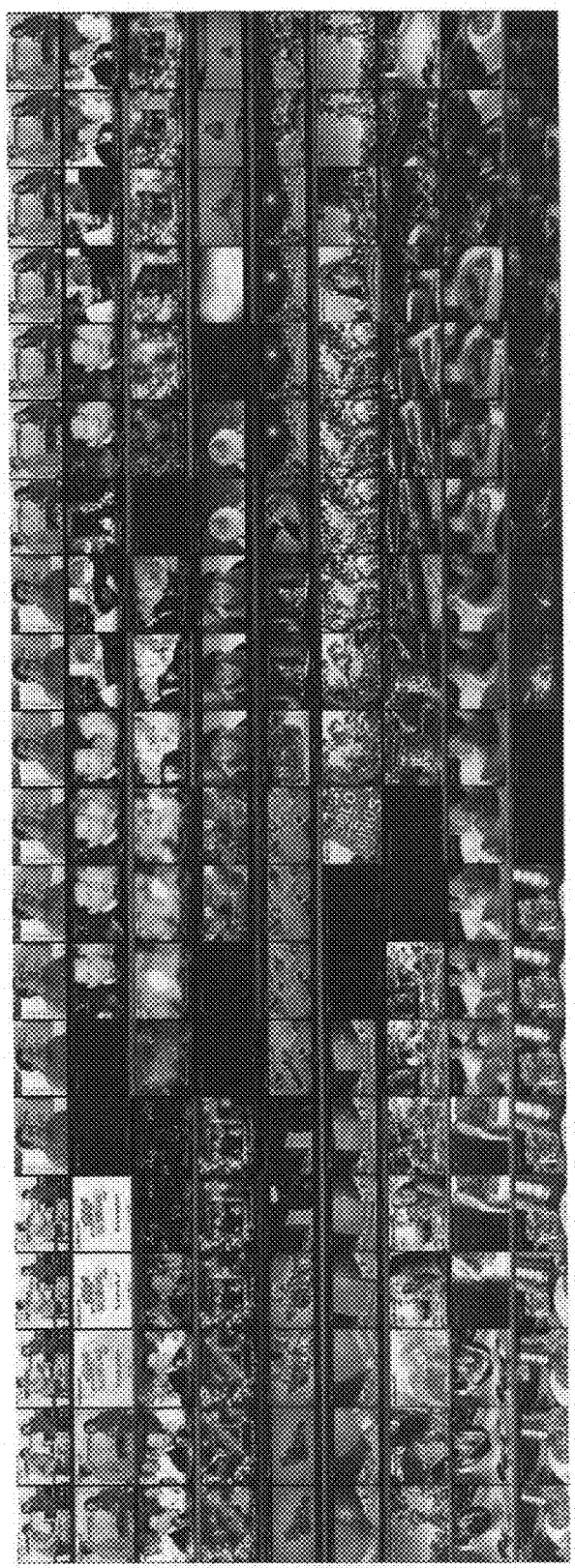
FIG. 9 is a frame/photogram sequence displaying frequency analysis according to the present invention.

As we can observe, the image is divided into quadrants, which are analyzed separately in order to obtain their corresponding equivalents in the frame/photogram below and, like this, calculate the optical flux. The fifth image-processing unit analyzes data from a frequency point of view (the same way can be done with the sound). The frame/photogram sequence shown in FIG. 9 displays the frequency analysis where it can be extracted where the 'image energy' concentrates.

Figure 10:
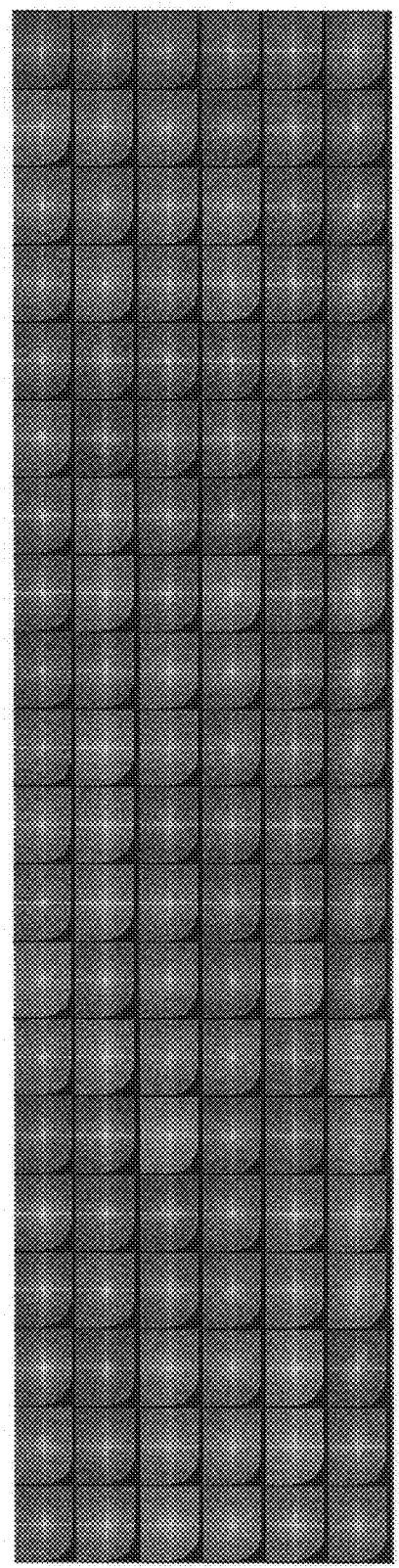
FIG. 10 is a frame/photogram sequence of FIG. 9 having corresponding spectrums relocated into a polar system according to the present invention.

This processing is repeated for the image in a grey scale, and for the components in red, green, and blue. FIG. 10 shows, for the same frames/photograms of the sequence in FIG. 9, their corresponding spectrums relocated into a polar system where an average for all the components is calculated by using the same distance as the zero frequency.

Figure 11:
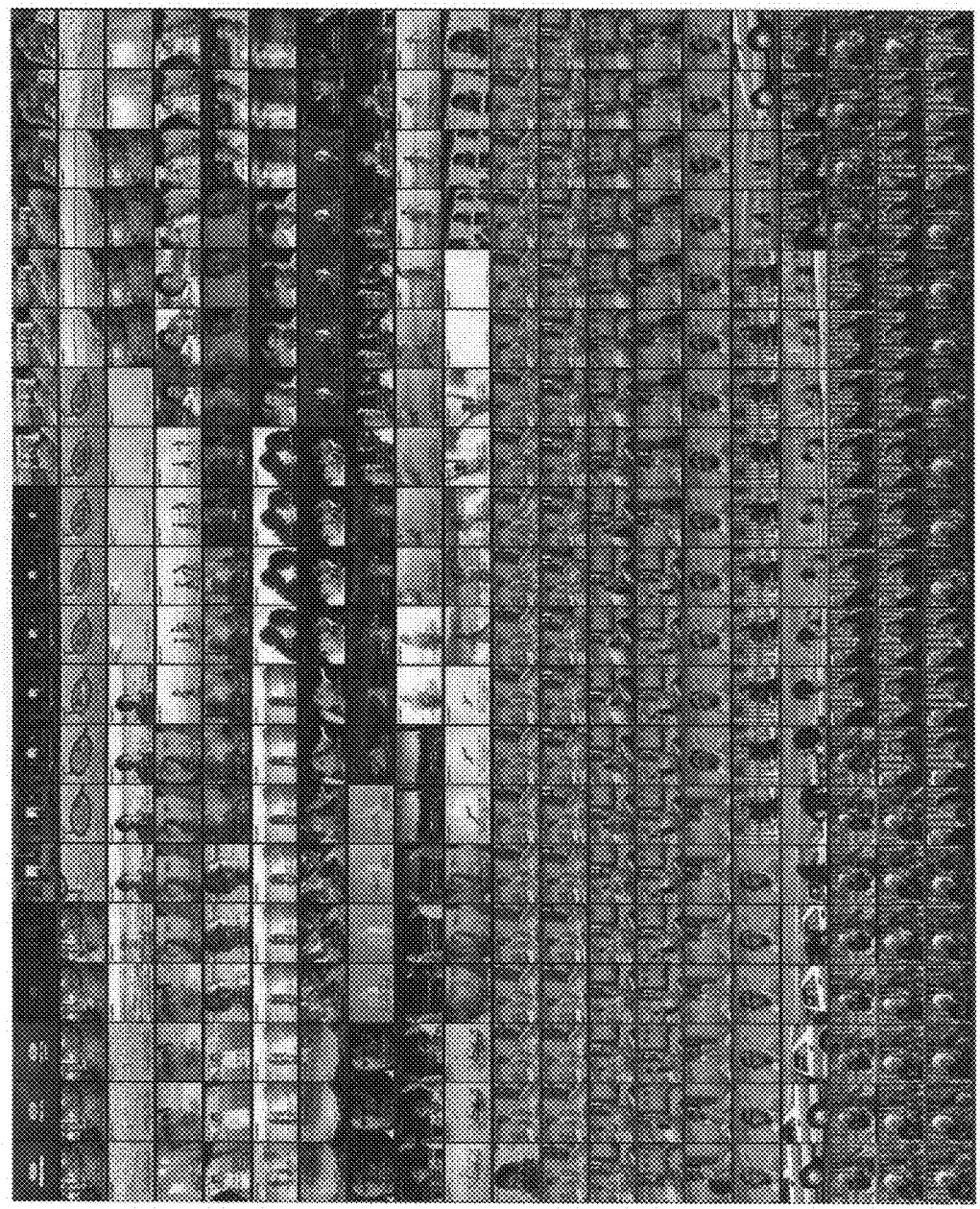
FIGS. 11 and 12 illustrate examples of complex scene analysis according to the present invention.
Figure 12:

The last processing unit supplements/complements the complexity measurement by means of a color segmentation algorithm. The more complex is a scene, the more objects it contains. An example of this analysis is presented in FIGS. 11 and 12. The segmentation algorithm output sequence is shown in FIG. 12.

It is possible to observe how the upper frames/photograms are less complex than the last frames/photograms from the sequence.

Concerning the automatic analysis of the audio parameters, the following list of Basic parameters is processed at a first level:
1. Sound power
2. Spectrum fractiles (50% to 90%) from low frequencies
3. Maximum frequency and frequency centroid
4. Power of low, medium and high frequencies
5. Power break (low, medium, and high totals).
6. Harmonic detector (frequency and power)

Figure 13:
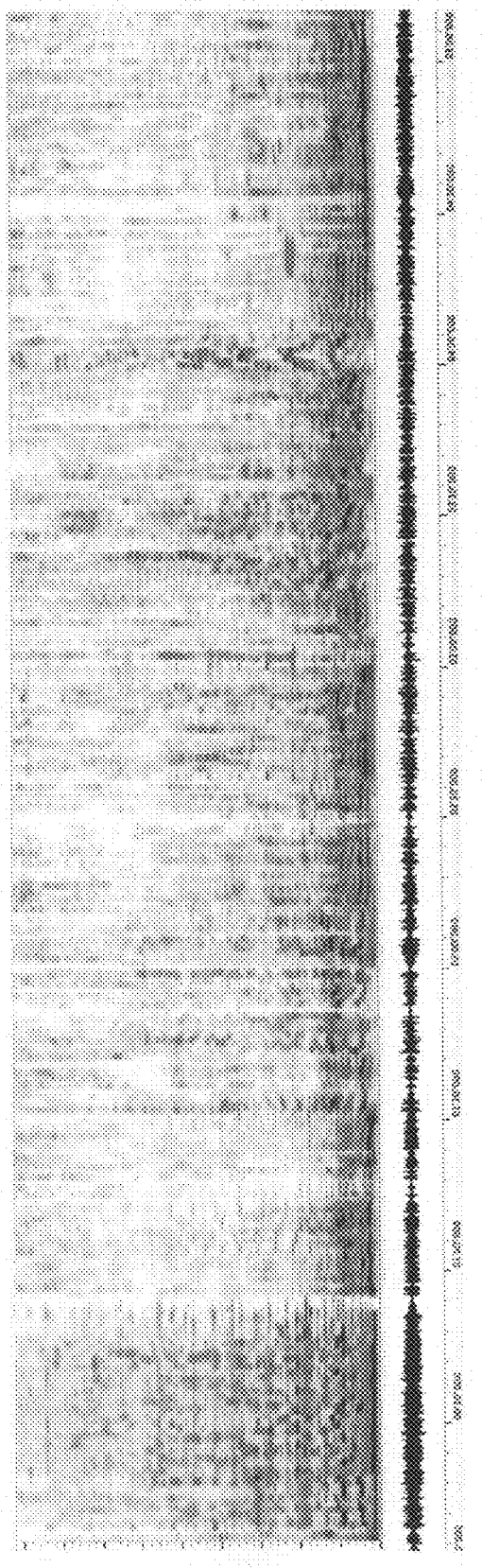
FIGS. 13 and 14 show monograms of selected sound tracks according to the present invention.
Figure 14:
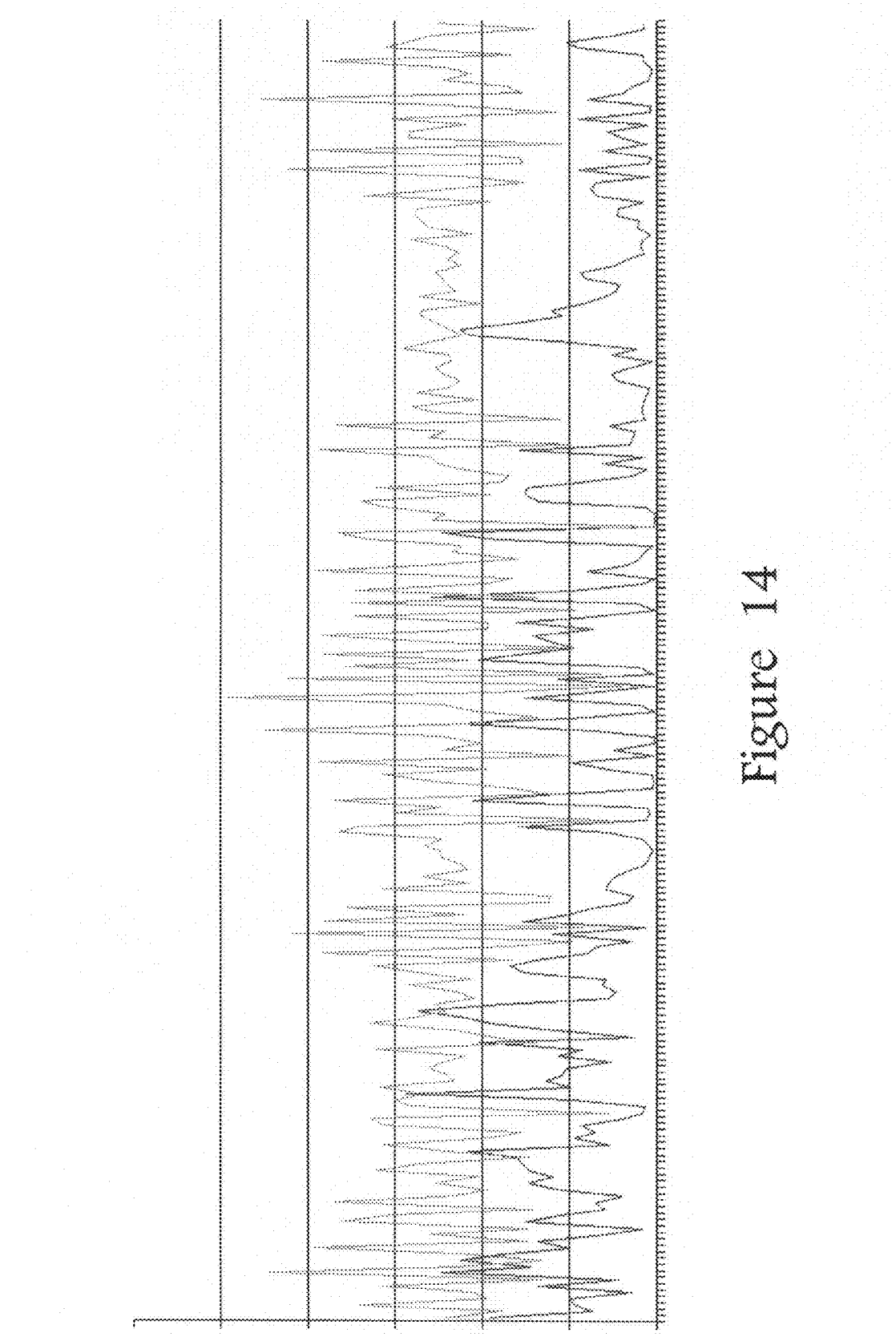

With these basic parameters, it is possible to develop more complex parameters such as music detectors, music and voice, or voice alone. FIGS. 13 and 14 show a monogram for 5 minutes of audio as well as an example of two of the extracted parameters (percentile 70% of the frequency energy and the level of the most powerful harmonic). Sound analysis techniques are described in U.S. Pat. No. 7,081,579, which is incorporated herein by reference in its entirety.

Process #4 establishes correlations among descriptors. Having obtained all necessary descriptors, a preliminary analysis that relates those parameters with audience data is processed. Some simple examples related to the underway study of cognitive data and its connection with the audience rating are presented below.

1. Rating/Scene Character Video 1.

The average rating for every scene type, as well as the associated average rating, the maximum rating and the standard drift/variation/deviation are analyzed. See below a data sample ordered according to the maximum rating.

| SCENE TYPE | Rating Average | St dev | Maximum |
|---|---|---|---|
| Intrigue | 8.10% | 1.29% | 12.60% |
| Dramatic impact | 8.40% | 1.25% | 12.40% |
| No apparent contribution | 7.80% | 1.36% | 12.40% |
| Violence | 8.20% | 1.10% | 12.30% |
| Interest | 8.30% | 1.25% | 12.10% |
| Suspense | 8.30% | 1.18% | 12.10% |
| Friendship | 7.80% | 1.28% | 11.70% |
| Love | 8.60% | 1.42% | 11.70% |
| End of plot | 10.60% | 0.70% | 11.50% |
| Family love | 8.30% | 1.32% | 11.40% |
| Daydream | 8.00% | 1.31% | 11.40% |
| Transition | 8.30% | 1.12% | 11.20% |
| Disappointment/lack of love | 7.60% | 0.94% | 11.10% |
| Unfaithfulness/Deception | 8.00% | 1.00% | 10.50% |
| Comic relief | 7.80% | 0.86% | 9.80% |
| Attraction | 7.30% | 0.96% | 9.70% |
| Turn-Plot | 7.30% | 1.32% | 9.70% |
| Stara of plot | 7.80% | 1.23% | 9.60% |
| Jealousy | 7.30% | 0.95% | 8.90% |
| Death | 7.60% | 0.54% | 8.70% |
| Characters' presentation | 7.70% | 0.31% | 8.00% |

2. Rating/Scene Character Video 2

| SCENE TYPE | Average | St dev | Max |
|---|---|---|---|
| Comic relief | 30.40% | 3.78% | 38.90% |
| Characters | 32.30% | 3.58% | 38.90% |
| Interest | 30.60% | 3.84% | 38.80% |
| No apparent contribution | 27.80% | 5.74% | 38.50% |
| Friendship | 31.30% | 3.56% | 38.20% |
| Intrigue | 30.50% | 3.50% | 38.10% |
| Unfaithfulness | 30.70% | 3.78% | 37.90% |
| Transition | 32.30% | 4.48% | 37.90% |
| Family love | 30.60% | 3.24% | 37.50% |
| Suspense | 28.80% | 4.37% | 37.30% |
| Dramatic impact | 31.20% | 3.36% | 37.10% |
| Disappointment | 30.10% | 3.39% | 36.90% |
| Discussion | 31.10% | 3.56% | 36.50% |
| Jealousy | 30.20% | 2.81% | 36.20% |
| Daydream | 29.50% | 4.14% | 35.90% |
| Love | 30.60% | 3.20% | 35.50% |
| Attraction | 29.90% | 3.25% | 35.50% |
| Characters' presentation | 30.20% | 3.62% | 34.10% |
| Death | 27.60% | 4.11% | 32.40% |
| Turn-plot | 29.40% | 1.55% | 31.90% |
| Location | 25.70% | 0.50% | 26.20% |
| Stara plot | 24.90% | 0.00% | 24.90% |

3. Rating/Scene Intensity Video 1

The associated average rating (average rating per minute of the scene group per defined intensity), the maximum rating, and the Standard variation/deviation are presented for every scene intensity (1-5) of video 1.

| Level | Average | St dev | Max |
|---|---|---|---|
| 5 | 8.4% | 1.23% | 12.60% |
| 2 | 7.6% | 1.18% | 12.40% |
| 4 | 8.0% | 1.21% | 12.10% |
| 3 | 7.4% | 1.11% | 11.30% |
| 1 | 7.7% | 0.67% | 8.50% |

Process #5 measures the output. Generalized ELO ("GELO") Module.

The ELO rating is a means of comparing the relative strengths of chess players, devised by Professor Arpad Elo. Players gain or lose rating points depending on the ELO rating of their opponents. If a player wins a game of chess in a rated tournament, they gain a number of rating points that increases in proportion to the difference between their rating and their opponent's rating.

Of course, the Elo rating does not supply any information on the individual aspects of a chess player's capabilities; it does not rate the individual style as a player, or how well his defense and game endings are. Ratings provide merely a comparison of performances, no more and no less. Nevertheless, the Elo rating system has proved to be a relatively accurate measure for predicting the outcome of chess matches, based on a quantified figure of the strength of individual chess players.

The GELO Measures Output Module of the Media Intelligence Universe is based on an innovative measure system that generalizes the application of ELO rating systems that are commonly applied in chess. Hereinafter we will denominate this new Generalized ELO system the GELO system.

The GELO measures allow in general when comparing new "Videos" (Films, video-shorts, mobile videos, music videos, videogames, advertisings, video clips and television programs, among others) with previously successful videos and with the predefined measure of success stated in each case, to predict the success potential of the new video in relation to the pre-defined measure.

As an example (but by no means restricting the scope of application), and in order to fix ideas the method is described as applied to TV shows (exemplifying the concept of "video") and the correlation between GELO measures and the audience ratings (exemplifying the concept of pre-defined measure of success). We will also present the way knowledge of the causes of TV rating gain or loss can be extracted using the GELO system to cognitive and image processing parameters such as image complexity, scene type (violence, love, family love, or action), presence of certain characters, audio spectrum, etc. The same process can be used for any video type.

Figure 15:
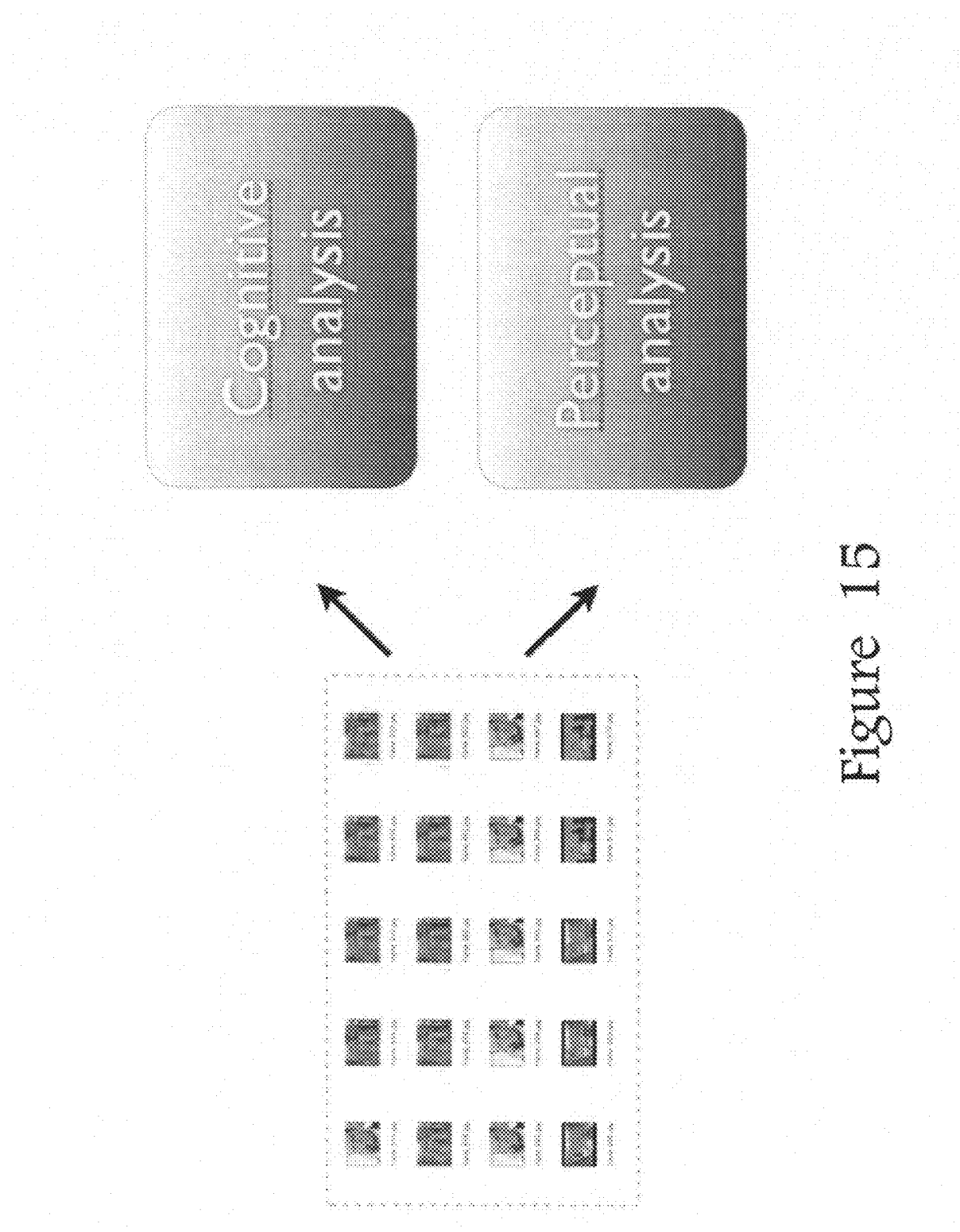
FIG. 15 illustrates two paths of video analysis according to the present invention.

To understand the behavior of GELO measures for audience ratings for a TV show (and also the competitors' evolution) it is necessary to process the historical successful videos in two separate ways as illustrated in FIG. 15.

The first module is the cognitive analysis module where scenes, commercials, and introductory materials are tagged with a time stamp in order to relate them to minute-to-minute rating data. Scenes are classified as interior, exterior, and also the type of scene (as described in process # 3).

Characters are also identified for each scene to determine which are the characters that produce the highest or lowest ratings. Other parameters are considered as for example the intensity of the scene, where each scene is measured with a number between 0 and 5.

The second module as described in process # 3: the perceptual analysis module would be applied in this case to gather visual and audio parameters from frames and sequences of frames in order to look for relationships with the minute-to-minute ratings. The perceptual parameters applied in this example include (but are not restricted to):

1. Simple red, green, blue, saturation, hue, and luminosity statistical measurements per frame.
2. Hue and saturation two-dimensional histogram
3. Line structures
4. Optical flow to detect movement and camera displacement over the scene
5. Fourier Spectral histogram of the luminosity map
6. Image complexity
7. Audio analysis: music, voices, and sounds (sound power, statistical model, low and high frequencies power ratio, harmonic detector, power steps, and frequency centroid).

Figure 16:
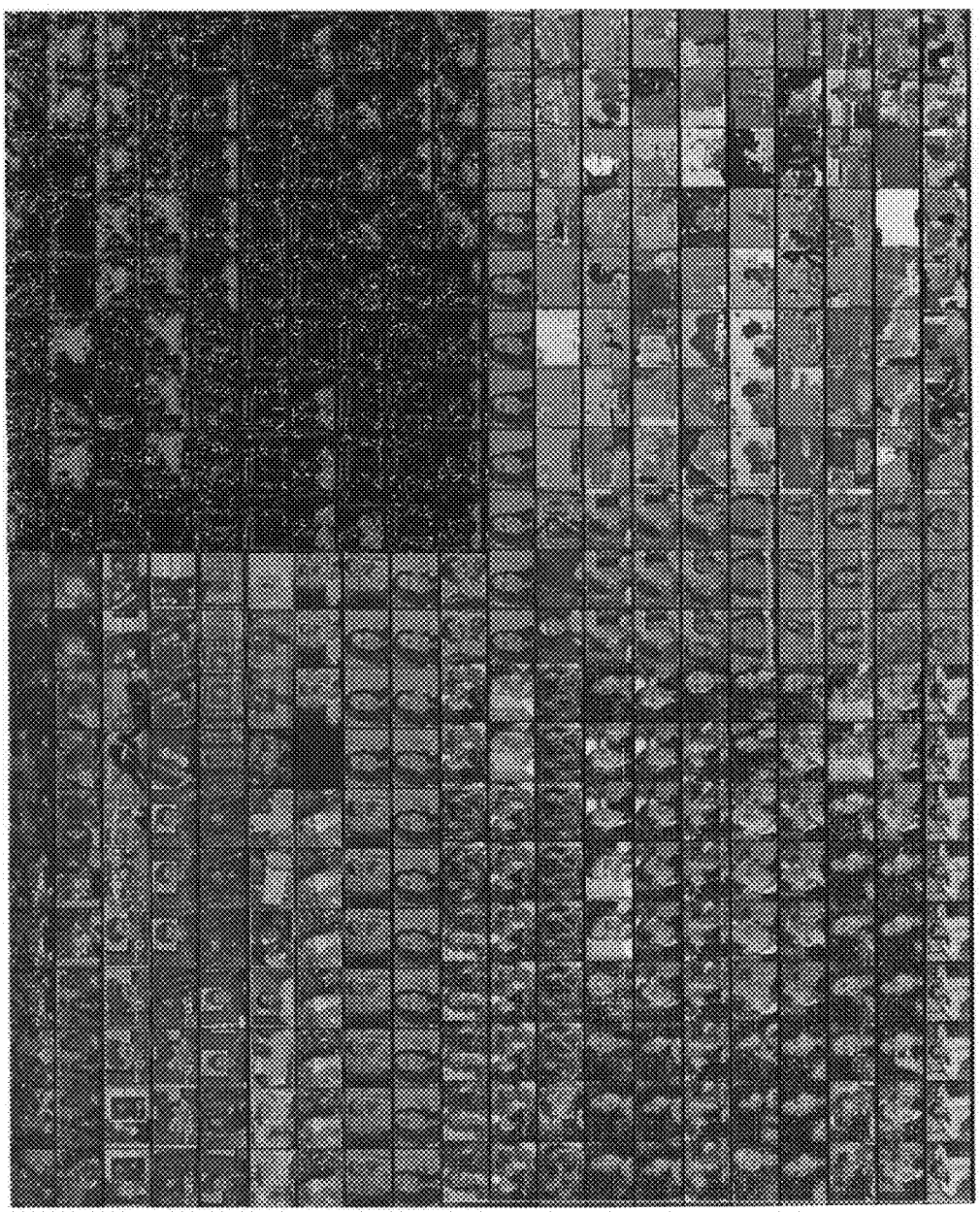
FIG. 16 shows some examples of perceptually processed sequences of frames according to the present invention.

FIG. 16 shows some examples of perceptually processed sequences of frames. In FIG. 16 hue measurement is shown in the upper left, line structure detection in the upper right, optical flow in the lower left, and image complexity measurement in the lower right.

All the chapters are pre-processed with both modules (cognitive and perceptual modules) systematically creates a large database of media descriptors, scene types, characters identification, etc.

Due to the fact that, in this example, the audience rating information is only given in a minute-by-minute basis, all this information is condensed by minutes using the minimum, the maximum, the mean and the standard deviation of all the parameters obtained during the same minute.

Figure 17:
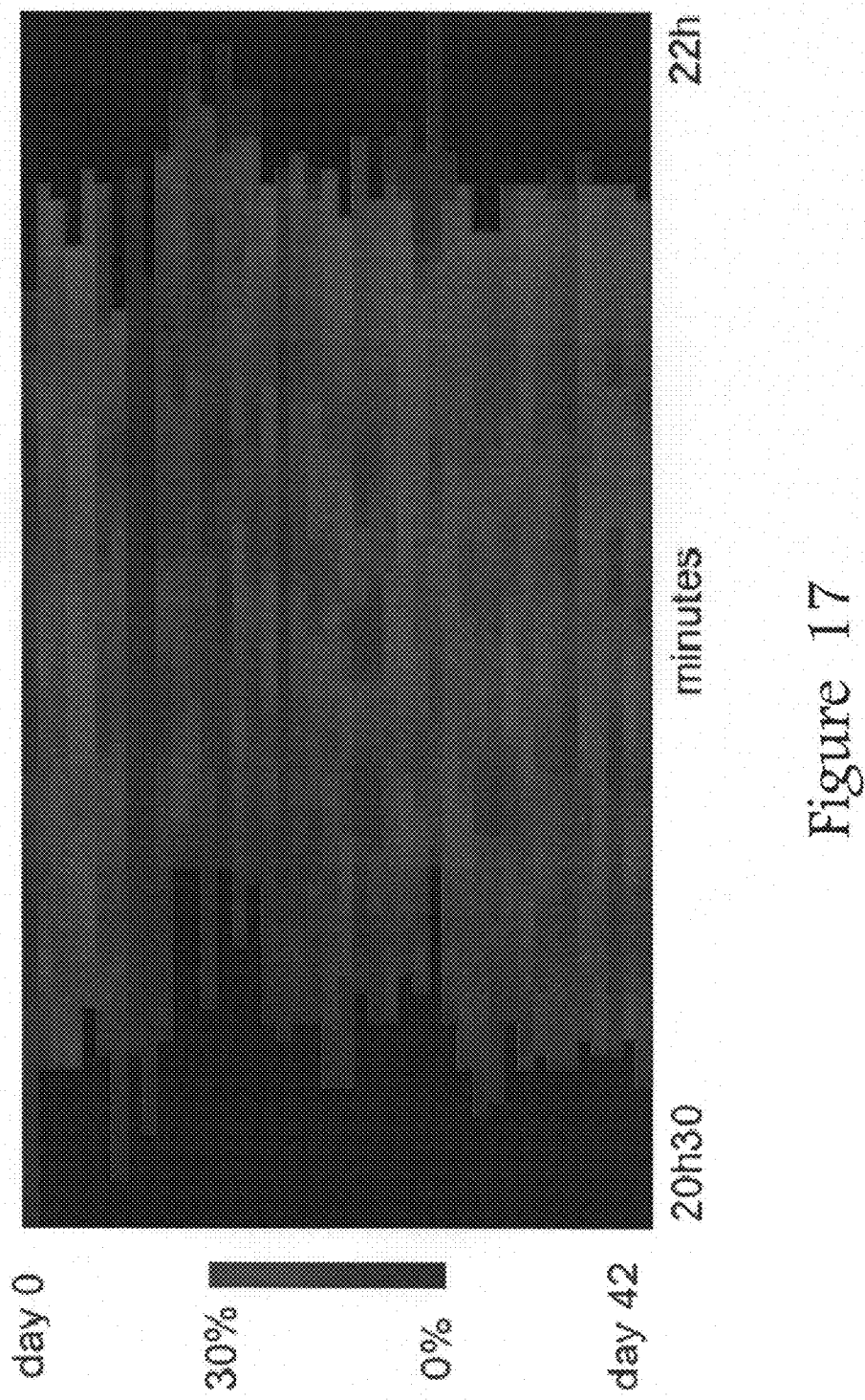
FIG. 17 shows the ratings for a TV show over a period of time according to the present invention.

Once all the information has been processed and included into a database, then the GELO number can be used to transform all this information into knowledge that reflects the causes underneath audience rating variation. Chapters and their ratings are displayed in a matrix with fast-time (minute-by-minute rating) in the columns and slow-time (chapter to chapter) in the rows. This can be seen in FIG. 17, where the ratings for a TV show are displayed over a period of two months approximately. It is important to show that the start and the end time of the TV show vary from chapter to chapter. FIG. 17 shows the rating over two months for the same TV show (between 0% and 30%).

Figure 18:
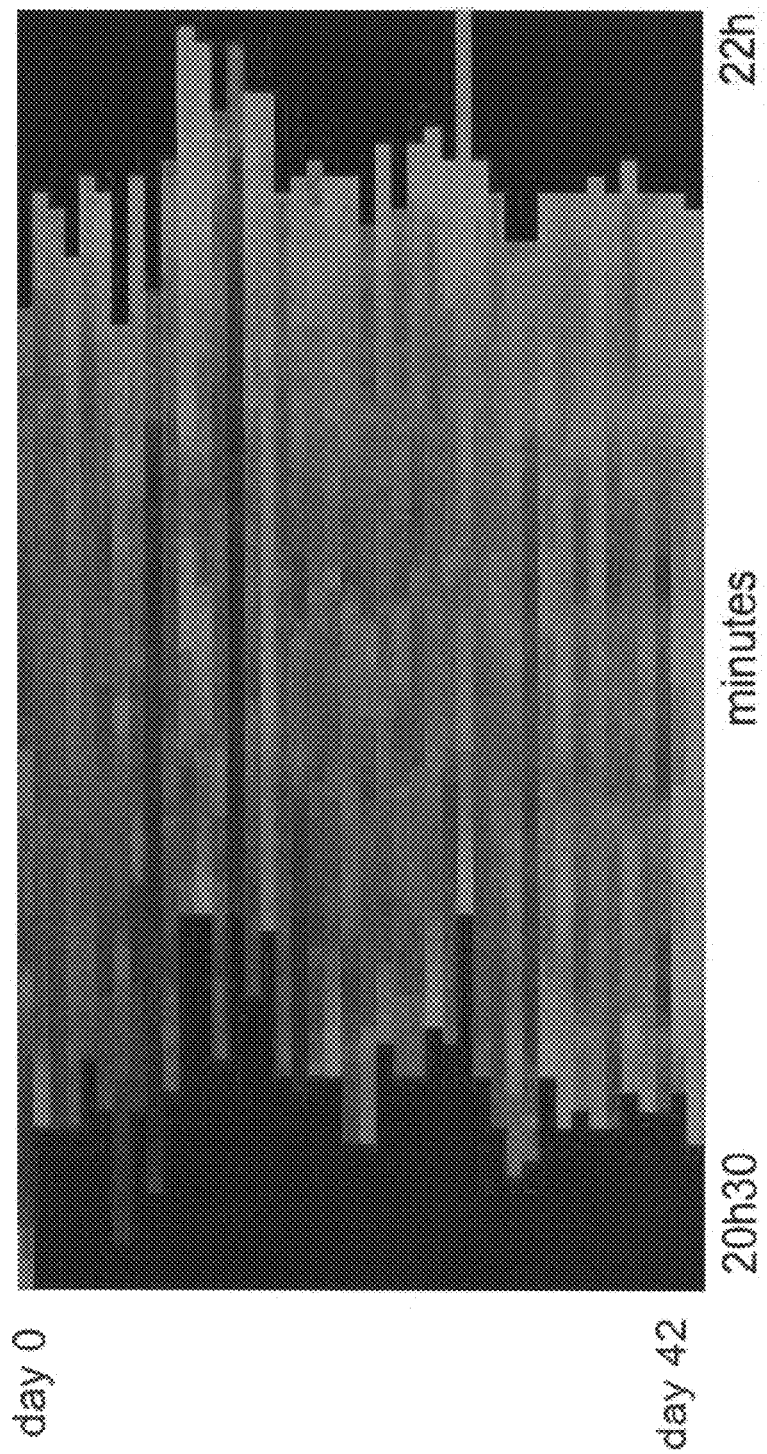
FIG. 18 shows media analyzed parameters of FIG. 17 according to the present invention.

The media analyzed parameters are also transformed into a similar matrix such as the one seen in FIG. 18, which shows an example of image complexity mean (red) and image complexity standard deviation in a minute-by-minute basis.

This allows the application of the GELO number for the immediate term (that means, comparing ratings inside the same chapter) and for the long term (comparing between chapters separated in time).

The GELO system establishes a different rating (from the ELO system) gain/loss step depending on the number of times an identity plays a game. The same approach can be extended to characters, scene intensity, and media parameters. This technique is executed in the following steps:

1) For each minute of each chapter, the information considered includes (but is not restricted to) the following:
   a) type and intensity of all scene present in this minute
   b) characters that appear in this minute
   c) number of seconds of commercials
   d) number of seconds of introductory material from the TV show
   e) evaluation of the minimum, the maximum, the mean and the standard deviation of all the media parameters of the frames belonging to the minute and separate them by the clustered classes.
   f) Audience rating values for this minute 2) Meaningful pairs of elements that will compete in groups within a modified GELO rating system. For example, pairs of characters, groups of characters, noise powers, image complexity classes, etc.

3) Selected pairs of elements belonging to the same chapter are evaluated using the GELO system and the procedure is repeated for the rest of chapters. In the same way, selected elements from different chapters are evaluated (again with GELO) in order to gather knowledge about the chapter-to-chapter rating changes.

Figure 19:
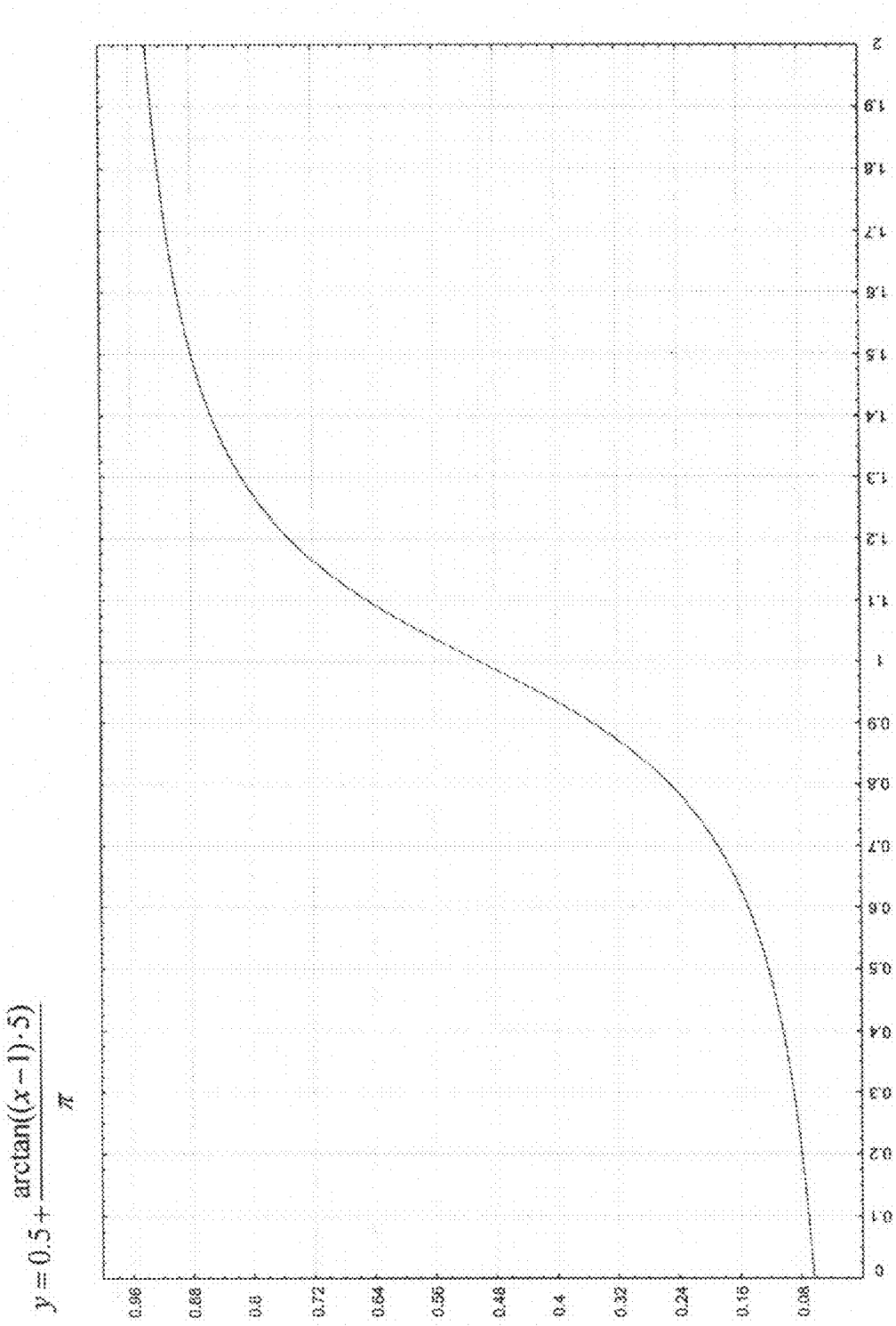
FIG. 19 shows a graph of a growing function according to the present invention.

4) The GELO number update step is given by:
   a) $S_a$ is the TV show audience rating for player A
   b) $S_b$ is the TV show audience rating for player B
   c) $R_a$ is the applied GELO rating for player A
   d) $R_b$ is the applied GELO rating for player B e) The new rating $R'_a$ is updated with the equation: $R'_a = R_a + C_{ab} K_a (S_a - S_b)$ f) Where $K_a$ is the inverse of the number of games in which player A participates.

g) $C_{ab}$ determines the rating update related to the entropy of the result of the game. This means that if the result is not the expected, then GELO number rating will increase or decrease more than if the results are likely the expected. For the first games of every player, $C_{ab}$ does not take effect in order to achieve a good statistical base. In other words, $C_{ab}=0$ if the result is the expected one and $C_{ab}=1$ if the result is an absolute surprise.

h) Being $m_a$ (mean) and $\sigma_a$ (standard deviation) the parameters that estimate the a posteriori TV rating difference performance of player A against its opponents (variable A) and $m_b$ (mean) and $\sigma_b$ (standard deviation) an opponent posteriori same parameters (variable B), then the subtraction of these two random variables is also a Gaussian random variable with mean ($m_s = m_a - m_b$) and standard deviation:

$$\sigma_s = \sqrt{\sigma_a^2 + \sigma_b^2}$$

i) The probability to win for player A against player B is given by:

$$P\{A - B > 0\} = \frac{1}{\sqrt{2\pi}\,\sigma_s} \int_0^\infty \exp\left(\frac{(x - m_s)^2}{2\sigma_s}\right) dx$$

j) To finally evaluate Cab, given the result of the game (A−B, that is, the difference between the audience ratings of both players), the normalized distance is evaluated as a measure of the entropy:

$$u = \frac{(A - B) - m_s}{\sigma_s}$$

k) The last step is to apply a growing function which transforms the u value into $C_{ab}$, taking into consideration its Gaussian nature (i.e. the region $0 < |u| < 0.5$ corresponds to the 68% of the distribution, the region $0.5 < |u| < 1$ to the 95%, etc). The selection of the transforming function contemplates heuristics analysis and is always a growing function, such as the one shown in FIG. 19.

The procedure followed to apply the new GELO methodology to TV show audience ratings has been described in detail as an example on how this is applied for any kind of video with any pre-defined success measure.

Some non-trivial and key generalizations of the ELO concept have been invented in order to design the GELO rating system that is applicable to "video competitions". Furthermore, the ability to seek the videos in sets of perceptual and cognitive temporal parameters and apply the GELO rating model to them, represents the next step beyond the state of art of video analysis. The direct application to TV programs presented shows the next generation—beyond the state of the art—for TV rating analysis.

In a preferred embodiment, the processes described herein measure innovation/prediction cycles in video structure by using spectrum variables for power law detection. They also measure deviation analysis from the universality trend through detection of cycles from the universality trend and the detection of innovation and prediction wavelets.

Figure 20:
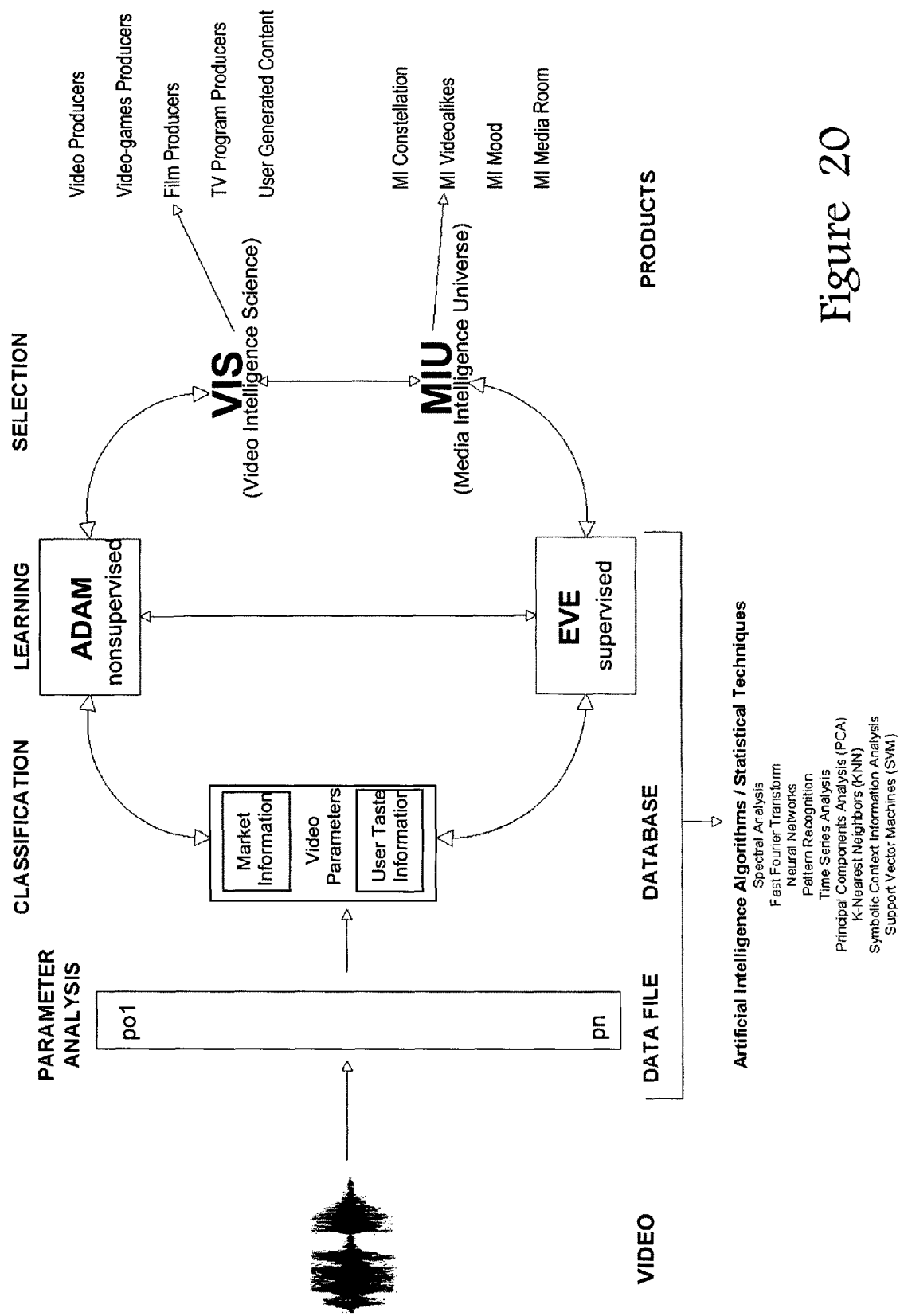
FIG. 20 is a schematic overview of the technology and process according to the present invention.

As shown in FIG. 20, following analysis of the video characteristics, software modules according to a preferred embodiment of the present invention learn a user's video preferences. The software uses two modules; one called ADAM, a cluster recognition engine, and another called EVE, a recommendation engine.

ADAM is a conceptual clustering engine that is based on physical pattern recognition models. This non-supervised learning system generates a hierarchical tree structure that is based on topological metrics, which automatically determines the final number of clusters while allowing for automated related variable detection. The methodology for detecting social trends is completely scalable, and has been successfully applied in many other areas. It is also used for the preliminary visualization engine described in more detail below.

EVE is a non-linear kernel learner, which had been successfully used in many other commercial applications. The application of EVE in video is similar to the referred application "Music Taste Test" in U.S. Pat. No. 7,081,579. This supervised learning system uses technology that has been proven to outperform statistical and neural network systems. A mathematically elegant solution which is relatively easy to customize and refine, the algorithm uses a direct strategy to capture personal Von Neumann Morgenstern utility functions. Due to their elegant and parsimonious mathematical architecture, both ADAM and EVE have been easily ported to new operating system environments, such as Symbian 60.

After the system has learned a user's video preferences, it can connect the user with video selections based on his or her likes and dislikes. User preference techniques are described in U.S. Pat. No. 7,081,579.

Figure 21:
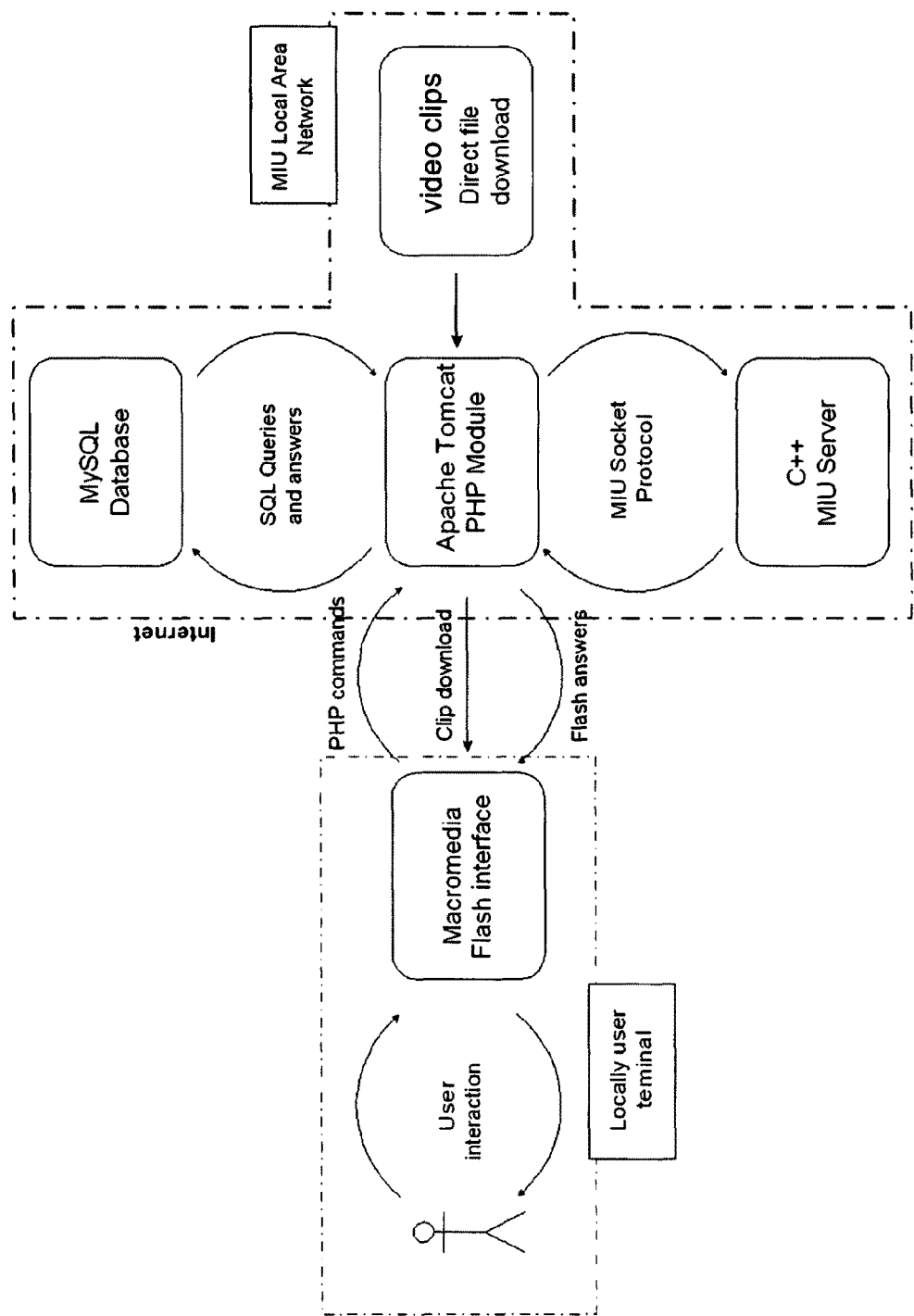
FIG. 21 is a schematic of the global system architecture of the present invention.

FIG. 21 shows the server architecture that has been developed to interact with a user though an active web page. The user interacts locally with a user visual interface. In a preferred embodiment, the visual interface may be a downloaded Macromedia Flash Player that runs locally in the user terminal and communicates with the Media Intelligence Universe (MIU) Environment. The MIU environment is made of several modules:

The database module consists of a database server, such as a MySQL Database, that stores metadata information for videos (name of studio, director, actors, clip location, etc).

The video clip storage module stores representative clips of all the videos that are in the database so the visual interface can download them.

The MIU server module makes all the computations necessary to provide the services. In a preferred embodiment, it is an ANSI C++ portable application that communicates via sockets.

The Web server module manages all the communications with the rest of modules and with the user visual interface. In a preferred embodiment, the web server module may be an active web page coded in PHP that runs under an Apache Tomcat Web server.

The starting point of the Media Intelligence Universe is the ability to extract quantitative information from a video stored in digital format. The different types of mathematical procedures used to extract characteristic parameters are described in detail in U.S. Pat. No. 7,081,579. The analysis module is designed to be extremely portable and self-constituent, which means that it contains all the information it requires. Accordingly, the input of the MIU server is a list of videos with their respective descriptors (set of real numbers that could define different type of signal analysis, for example, the mean frequency, the level of noise, the mean power, image noise, rhythm, camera movements, etc). A unique identifier is assigned to each video, which is used to retrieve metadata from the database, such as title, name of studio, director, actors, clip location, etc.

Sometimes it is useful to apply a technique called Eigen Value Decomposition to find a reduced set of useful descriptors such as based on Principle Component Analysis (PCA) condensing the information because descriptors are not totally independent. So as to be able to filter the recommended list, some auxiliary non-mathematical information is also sent (such as, the year and the genre of the song). All this information is stored in an ASCII file that the MIU Server can read, parse, and analyze. The format of the MIU Server input ASCII file may be as follows:

id;0;1;1;YEAR;GENRE;PCA1;PCA2;PCA3;VAR1; VAR2;VAR3;VAR4;VAR5 . . .

where PCA_ refers to specific parameter values and VAR_ refers to the video descriptors.

The PHP module has the possibility to select whether to use the PCAs or the descriptors. With PCAs, the calculations are done faster, but with the descriptors, it will be possible to also send weights to disable some descriptors and find, for example, videos with similar rhythm but with different moods.

Figure 22:
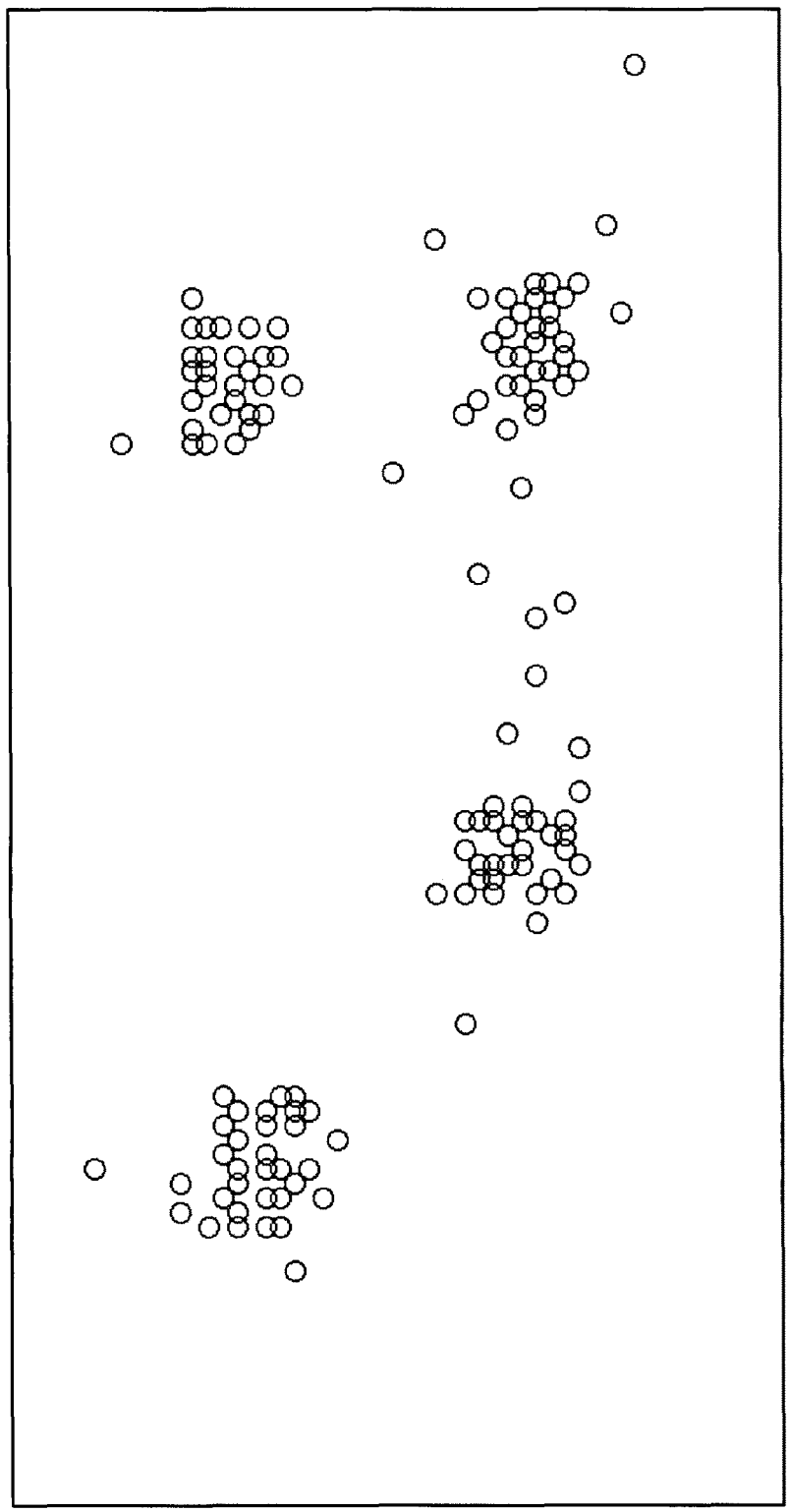
FIG. 22 is a view of a portion of the universe of analyzed videos illustrating some success clusters.

An important aspect of the present invention is to analyze historical data related to the commercial success of films, video-shorts, mobile videos, music videos, videogames, advertisings, video clips, and television programs in order to create a "success" database. Such parameters may include additional data such as total sales, date of release, awards, critical acclaim, and other common indicators of commercial success. The success database will enable comparisons between new or unreleased content and previously released content regarding the intrinsic "video" parameters (as the ones described above), in order to predict the market success of new projects as well as gain other meaningful data to inform other marketing decisions. Each analyzed video is mapped onto a grid and positioned according to its mathematical characteristics, as illustrated in FIG. 22. Videos with mathematical similarities are positioned very close to one another. The videos that had been recent successes were grouped into a limited number of small "success" clusters all over the grid but with vast spaces between them.

The techniques taught by the present invention can be used throughout the creation and lifetime of the project. Below is listed some of the utility in the Pre-production, Post production, and Marketing phases. However, the potential of the product can have an impact in all the Industry value chain.

1) Pre-Production

At the pre-production level, the system generally does not have a global application. However it can analyze separately the main ingredients of the video when ready (previous to the production) such as script, initial music tracks selection, actors voices, dailies, etc.

2) Post Production

Figure 23:
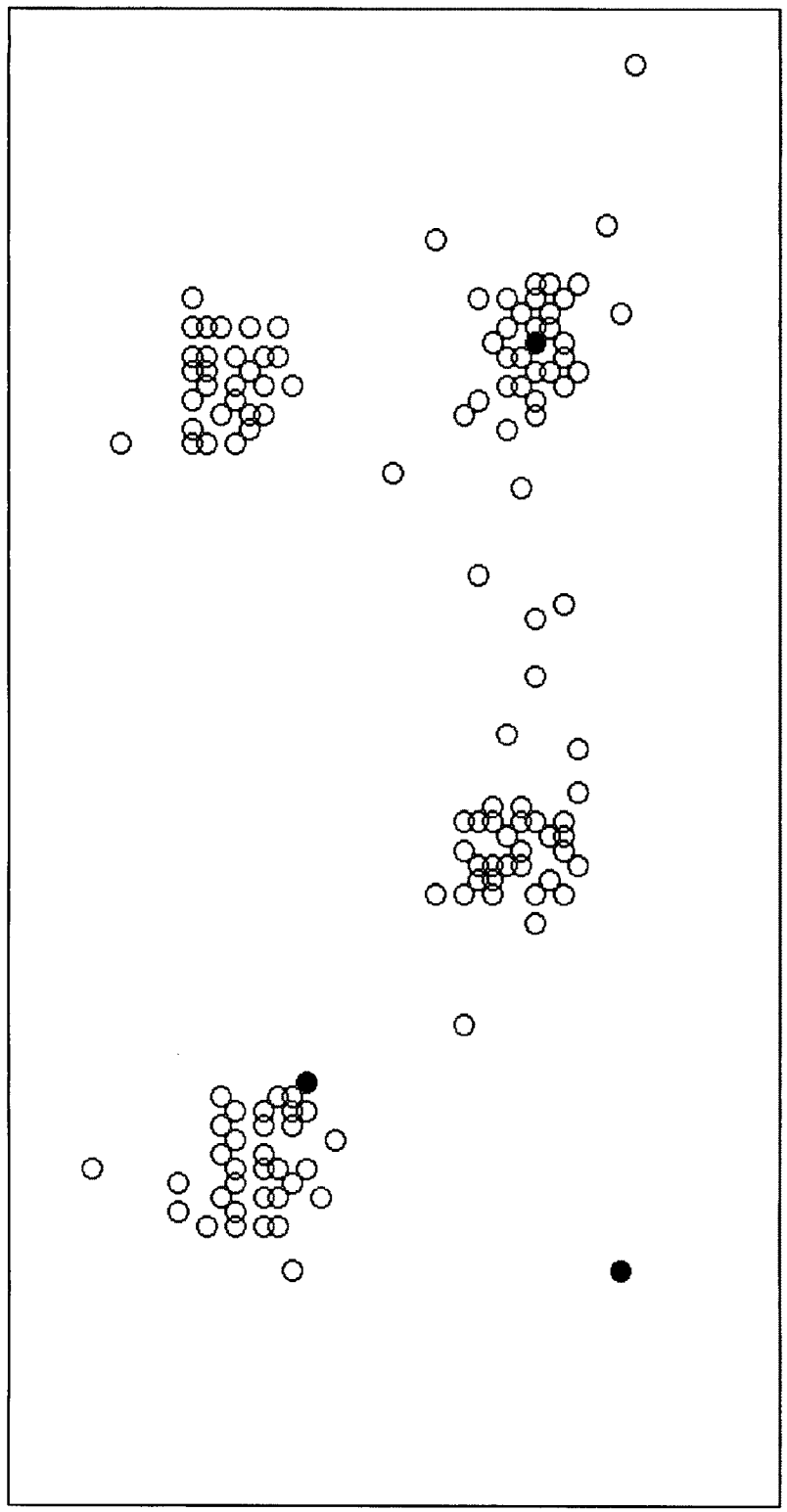
FIG. 23 is a view of a portion of the universe of analyzed videos shown in FIG. 22, with some new videos superimposed thereon.

During postproduction, the system of the present invention can aid in pacing, scene length, music placement, Foley recording, scene exclusion, etc. . . . Consider, for example, a new film in production, if the project is close to a "success cluster" (of similar films"), editing can be optimized in order to move the final production toward a "success cluster". FIG. 23 is an illustration of three new videos as analyzed and graphed on the grid of "success clusters". In this illustration, there is one video that falls squarely within a success cluster, one video that is on the edge of a success cluster and one video that is clearly outside the success clusters.

3) Marketing

The final product will be analyzed and compared to other releases enabling market comparisons, success potential objective measures, and clues to better position the product.

4) Film Recommendation for Final Consumers

In the retail space, either physical or digital, for TV, Films or videos a Film Recommendation system for TV programs or videos can be developed based on the similarities that determine the Film clusters/TV program clusters or video clusters. The similarities are determined trough the EVE and ADAM non-supervised and supervised learning systems using affinity values. The affinity value is a rating that shows how closely related the mathematical patterns in one video are to another. The lower the affinity value between two videos the more closely related they are.

The learning systems use artificial intelligence applications as well as other methods to analyze the underlying mathematical patterns in the videos. The technology can isolate and separate many distinct events that occur in films, video-shorts, mobile videos, music videos, videogames, advertisings, video clips, and television programs, among others. By doing this, combined with other mathematical calculations, the system can develop a highly accurate and scientific tool. By revealing some before-unseen scientific information about films, video-shorts, mobile videos, music videos, videogames, advertisings, video clips and television programs, among others we can use that to better understand the art and man's desire to be engulfed in compelling entertainment.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method of analyzing videos, said method comprising the steps of:
   a) providing a digital database comprising a plurality of videos stored as digital video files;
   b) selecting one of said video files for analysis;
   c) dividing said selected video file into a plurality of discrete parts;
   d) using processing techniques on each part of said selected video file to establish a plurality of coefficients, wherein said coefficients are representative of predetermined quantifiable characteristics of said selected video, and wherein said processing techniques extract a plurality of video descriptors, including perceptual and cognitive descriptors, audio descriptors, and metadata;

e) establishing correlations among the video descriptors, audio descriptors, and metadata and determining a representative value of the coefficients for each characteristic from each said part of said selected video file;

f) compiling a video vector comprising a sequential list of said representative values of the coefficients for each said characteristic for said selected video file; and (g) repeating steps b) through f) for each video in said database.

2. The method according to claim 1, wherein the characteristics are selected from the group consisting of:
- static image analysis;
- optical flow and image moments;
- script analysis;
- music;
- sound; and
- combinations of the above and how each characteristic and relevant parameter combinations change over time.

\* \* \* \* \*